(12) United States Patent
Volk et al.

(10) Patent No.: US 7,574,448 B2
(45) Date of Patent: *Aug. 11, 2009

(54) METHOD AND APPARATUS FOR ORGANIZING AND PLAYING DATA

(75) Inventors: Andrew R. Volk, San Francisco, CA (US); Ronald Jacoby, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 10/670,099

(22) Filed: Sep. 22, 2003

(65) Prior Publication Data

US 2004/0254958 A1    Dec. 16, 2004

Related U.S. Application Data

(63) Continuation-in-part of application No. 10/459,341, filed on Jun. 11, 2003, now Pat. No. 7,512,622.

(51) Int. Cl.
*G06F 7/00* (2006.01)
*G06F 3/00* (2006.01)

(52) U.S. Cl. .................. 707/102; 707/10; 715/733

(58) Field of Classification Search .......... 707/1–10, 707/100–102, 104.1, 200–201; 715/500, 715/513, 760, 733; 709/201, 217–224, 203; 705/1, 50; 345/418; 369/30.01, 30; 84/600–601
See application file for complete search history.

(56) References Cited

U.S. PATENT DOCUMENTS

| | | | | |
|---|---|---|---|---|
| 5,267,351 A | * | 11/1993 | Reber et al. ............. | 707/104.1 |
| 5,892,535 A | * | 4/1999 | Allen et al. ............... | 725/36 |
| 5,956,716 A | * | 9/1999 | Kenner et al. ............. | 707/10 |
| 6,026,439 A | * | 2/2000 | Chowdhury et al. ...... | 709/223 |
| 6,055,543 A | | 4/2000 | Christensen et al. | |
| 6,064,379 A | * | 5/2000 | DeMoney ................. | 715/500.1 |
| 6,128,621 A | | 10/2000 | Weisz | |
| 6,134,596 A | * | 10/2000 | Bolosky et al. ........... | 709/233 |
| 6,185,587 B1 | * | 2/2001 | Bernardo et al. .......... | 715/513 |
| 6,262,724 B1 | * | 7/2001 | Crow et al. ............... | 715/723 |
| 6,311,194 B1 | * | 10/2001 | Sheth et al. ............... | 715/505 |

(Continued)

FOREIGN PATENT DOCUMENTS

EP    1 176 520 A    1/2002

(Continued)

OTHER PUBLICATIONS

PCT International Search Report dated Sep. 13, 2004 for International Application No. PCT/US04/18714.

*Primary Examiner*—Miranda Le
(74) *Attorney, Agent, or Firm*—James J. DeCarlo; Greenberg Traurig, LLP

(57) ABSTRACT

The present invention provides a general solution to presenting media interface and navigation tools for content provided from a plurality of sources. The invention maintains a user at a single site regardless of the source of the media content. This permits a consistent interface to be presented to the user. Because the user remains at the same site, differences in tiered membership may be tracked so that the user is only presented with content that the user is permitted to view. The invention uses a metadata language to characterize content so that viewer type, membership level, and other information can be maintained and used for an enjoyable viewing experience.

13 Claims, 16 Drawing Sheets

U.S. PATENT DOCUMENTS

| | | | |
|---|---|---|---|
| 6,317,883 B2 * | 11/2001 | Marics | 725/56 |
| 6,421,717 B1 * | 7/2002 | Kloba et al. | 709/219 |
| 6,452,609 B1 * | 9/2002 | Katinsky et al. | 715/716 |
| 6,505,169 B1 | 1/2003 | Bhagavath et al. | |
| 6,523,046 B2 | 2/2003 | Liu et al. | |
| 6,538,665 B2 * | 3/2003 | Crow et al. | 715/723 |
| 6,549,922 B1 | 4/2003 | Srivastava et al. | |
| 6,731,312 B2 | 5/2004 | Robbin | |
| 6,760,721 B1 | 7/2004 | Chasen et al. | |
| 6,760,916 B2 * | 7/2004 | Holtz et al. | 725/34 |
| 6,763,377 B1 * | 7/2004 | Belknap et al. | 709/223 |
| 6,769,127 B1 * | 7/2004 | Bonomi et al. | 725/39 |
| 6,775,675 B1 * | 8/2004 | Nwabueze et al. | 707/100 |
| 6,813,690 B1 * | 11/2004 | Lango et al. | 711/118 |
| 6,833,848 B1 * | 12/2004 | Wolff et al. | 715/719 |
| 6,925,469 B2 * | 8/2005 | Headings et al. | 707/102 |
| 6,925,495 B2 * | 8/2005 | Hegde et al. | 709/223 |
| 6,976,229 B1 * | 12/2005 | Balabanovic et al. | 715/838 |
| 6,993,532 B1 * | 1/2006 | Platt et al. | 707/102 |
| 7,003,726 B2 * | 2/2006 | Walker et al. | 715/717 |
| 7,046,914 B2 * | 5/2006 | Jasinschi et al. | 386/95 |
| 7,069,310 B1 * | 6/2006 | Bartholomew | 709/219 |
| 7,096,416 B1 * | 8/2006 | Smith et al. | 715/500.1 |
| 7,102,643 B2 * | 9/2006 | Moore et al. | 345/473 |
| 7,131,059 B2 * | 10/2006 | Obrador | 715/209 |
| 7,162,475 B2 * | 1/2007 | Ackerman | 707/9 |
| 7,174,126 B2 * | 2/2007 | McElhatten et al. | 455/3.04 |
| 7,177,872 B2 * | 2/2007 | Schwesig et al. | 707/10 |
| 7,178,106 B2 * | 2/2007 | Lamkin et al. | 715/716 |
| 2002/0053078 A1 * | 5/2002 | Holtz et al. | 725/14 |
| 2002/0152267 A1 * | 10/2002 | Lennon | 709/203 |
| 2003/0233349 A1 * | 12/2003 | Stern et al. | 707/3 |
| 2003/0237043 A1 * | 12/2003 | Novak et al. | 715/500.1 |
| 2004/0024898 A1 * | 2/2004 | Wan | 709/231 |
| 2004/0088731 A1 * | 5/2004 | Putterman et al. | 725/94 |
| 2004/0093349 A1 | 5/2004 | Buinevicius | |
| 2004/0096199 A1 * | 5/2004 | Chou et al. | 386/125 |
| 2004/0103297 A1 * | 5/2004 | Risan et al. | 713/200 |
| 2004/0128308 A1 * | 7/2004 | Obrador | 707/102 |
| 2004/0186993 A1 * | 9/2004 | Risan et al. | 713/164 |
| 2004/0201609 A1 * | 10/2004 | Obrador | 345/723 |
| 2004/0230655 A1 * | 11/2004 | Li et al. | 709/205 |
| 2005/0022252 A1 * | 1/2005 | Shen | 725/135 |
| 2006/0010075 A1 * | 1/2006 | Wolf | 705/57 |
| 2007/0047816 A1 * | 3/2007 | Graham et al. | 382/181 |
| 2007/0154169 A1 * | 7/2007 | Cordray et al. | 386/83 |

FOREIGN PATENT DOCUMENTS

| | | |
|---|---|---|
| WO | WO 02/080443 A | 10/2002 |
| WO | WO 02/093427 A | 11/2002 |
| WO | WO 03/098487 A | 11/2003 |

* cited by examiner

METHOD AND APPARATUS FOR ORGANIZING AND PLAYING DATA

CROSS-REFERENCE TO RELATED APPLICATION

This application is a continuation-in-part of U.S. application Ser. No. 10/459,341 filed on Jun. 11, 2003 now U.S. Pat. No. 7,512,622 for METHOD AND APPARATUS FOR ORGANIZING AND PLAYING DATA, which is hereby incorporated by reference.

BACKGROUND OF THE INVENTION

1. Field of the Invention

The present invention relates to the field of organizing and playing data.

Portions of the disclosure of this patent document contain material that are subject to copyright protection. The copyright owner has no objection to the facsimile reproduction by anyone of the patent document or the patent disclosure as it appears in the Patent and Trademark Office file or records, but otherwise reserves all rights whatsoever.

2. Description of Related Art

The personal computer has become a resource for entertainment as well as traditional data processing functionality. In many cases, the personal computer has replaced home stereo systems as a source of audio entertainment. Many users have replaced hard copies of books and magazines with electronic copies often referred to as reading materials for review via a computer. Another popular use for personal computers is the presentation of media information and entertainment.

Often, the providing of media entertainment, such as audio or video entertainment, occurs via a network, such as the internet. Certain web sites are known for the availability of video clips of movies and television programs, or audio program files, that a computer user can view, listen to, and possibly purchase. In some cases, television or radio networks provide web sites devoted to their own shows or to a single show. Many times a web site is designed to provide an "enhanced" experience in real time during the broadcast of a television program. Such enhanced features may include comprehensive statistics in the case of sporting events, commercial tie-in and purchase opportunities in the case of entertainment programs, play-along quizzes, or even competition during game shows.

In some cases, additional media content is made available to internet users between broadcasts of programs to promote interest, loyalty, and viewing opportunities, when a program is not otherwise airing. There are a number of disadvantages with many of the current systems for obtaining such content via the internet as will be described below.

A number of web sites purport to provide a central location where a variety of media can be obtained and experienced by a user on a personal computer via a network. A disadvantage with many of these sites is a failure to provide a consistent interface for content from different sources. Another disadvantage is the failure to provide to the user only content that is actually playable by the user. Often the user is prompted to mistakenly buy player capability that the user doesn't want or need.

Certain web sites purport to provide a portal or central location for accessing media data and content from a variety of sources, including from different networks and internet media sources. A problem for a user on such a site is the inconsistency of the presented interface for different content. In a typical situation, a user may elect to view a content clip from a program from one of the broadcast networks. When the clip is selected, the user may actually be transferred to the network's own web site for viewing of the clip.

When the user is transferred, the entire interface for viewing clips is often changed to the interface supported by the source site. This diminishes the viewing experience for the user and requires the user to pay extra attention to where navigation and activation controls are located in order to effectively use the site for viewing of content.

Another problem occurs when a user is part of a tiered membership or subscription service on a portal site. Lower tiers of membership may have restrictions on which content is available. When the portal switches the user to the content source site, the user may be presented with all possible content, even though the user is able to view only a subset of the listed content. This diminishes the user's experience because the user is made aware of a limited experience.

Finally, the user may be referred to data that is not playable on the user's currently installed content player. The user may be presented with a list of available content that does not indicate which player is used or required to play the content. When a user selects a clip or content that requires a player that the user does not currently have, the user may be directed to a site where a new player can be obtained. Often these sites are confusing. A free player is often available, but the user is urged to purchase a "professional" or "full featured" version of a player not really needed for the clip that the user wants to play. Often the user mistakenly purchases the "for purchase" player instead of simply accepting the free player.

SUMMARY OF THE INVENTION

The present invention solves the foregoing and other needs. In certain embodiments, a method and system is provided for generating an interface at a web site on a network, with consistent features and navigation capabilities by collecting a plurality of media files for use with the website, associating metadata attributes with each of the media files and mapping the metadata attributes with locations on the interface.

In another embodiment, a playlist is created by compiling a data file that contains one or more sequentially placed unique identifiers that identify one or more pieces of content; and allowing the user to access the content out of sequence.

DETAILED DESCRIPTION

A method and apparatus for presenting and playing content on a network is described. In the following description, numerous details are set forth in order to provide a more thorough description of the embodiments of the present invention. It will be apparent, however, to one skilled in the art, that the present embodiment may be practiced without these specific details. In other instances, well known features have not been described in detail so as not to unnecessarily obscure the present invention.

Figure 1:
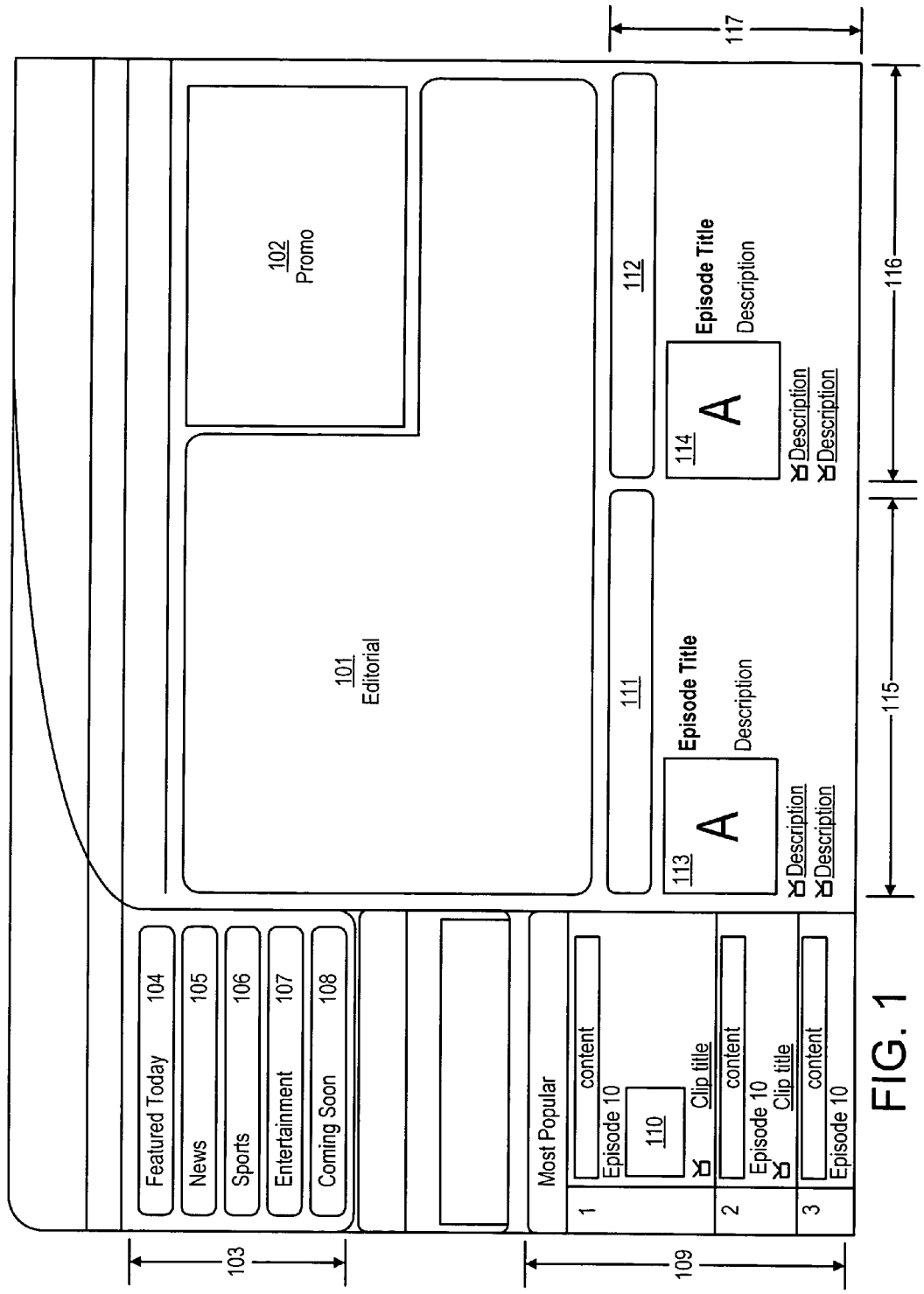
FIG. 1 illustrates a website of one embodiment of the present invention in an initial state.

The present embodiment invention provides a consistent interface and user navigation system for media clips from all sources. In the following description, an example of organizing and playing viewable content, such as video content, is described. It is understood that the invention has equal application to audio media content as well. FIG. 1 illustrates one embodiment of the interface of the present invention. The embodiment contemplates a drill down approach to certain aspects of navigation with FIG. 1 illustrating the top or home level of navigation. The display includes two display areas 101 and 102. Area 101 is referred to as an "editorial" area and can include show titles and logos, navigation tools, and other information. Region 102 is an area reserved for promotions and can include still promotions or advertisements or those provided in any other form such as created with Macromedia Corp.'s Flash tool and the like.

An area 103 includes links to a number of categories or "channels" that the user can select to be presented with viewing choices falling within a particular genre or type. FIG. 1 illustrates a number of channels by way of example, including "Featured Today" 104, News 105, Sports 106, Entertainment 107, and Coming Soon 108. By selecting one of these categories, the user is able to access another interface that provides choices related to the genre. Featured Today 104 is a channel that is suitable for breaking news or even for sponsored clips that may relate to a current film or to a broadcast event of the same or impending day. The selections may represent pre-recorded media or live broadcast media.

The provision of choices of selected shows, news, and sports is indicated in region 117. The show title, logo, or brand is indicated in regions 111 and 112. Below each logo bar is an information region 115 and 116, respectively, that provides program information to the user. This information includes the episode title and a brief description of the episode. It also includes a thumbnail image of the available show or clip in region 113 and 114.

A region 109 is also provided to the user that lists available content. The content may be sorted in a number of ways. In the example of FIG. 1, the content is listed as Most Popular, which may be based on any of a number of time periods, including by the day, the week, or even the hour. Also in the example of FIG. 1, the most popular clip listed may include a thumbnail 110 to provide additional information to the user of the available clip. The Most Popular listing may be with respect to all content, by channel, by category, or by any other suitable or desired population of media clips. It should be appreciated that in different embodiments of the present invention, the pixel size of the display can vary between different images. For instance, in the example illustrated in FIG. 1, the promotion in area 102 has a pixel size of 300×250 dots per inch (dpi) while the thumbnail 110 has a size of 88×66 dpi.

Figure 2:
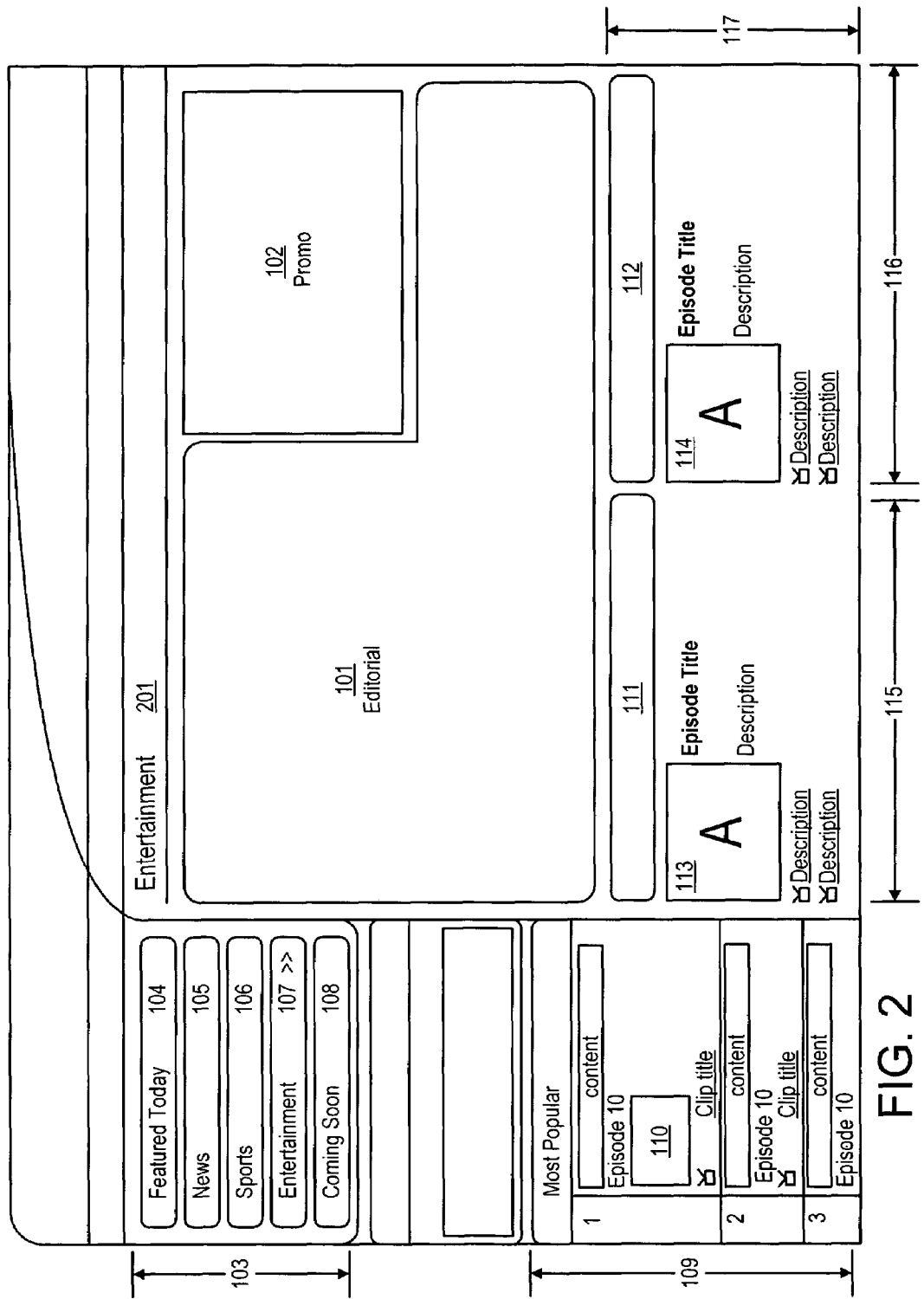
FIG. 2 illustrates a web site of one embodiment of the present invention after a user menu selection.

FIG. 2 illustrates the interface of one embodiment of the invention after the user has selected a channel. A user can select a channel by clicking upon the particular channel in the area 103. In the example shown, the user has selected the Entertainment 107 channel. This selection presents a slightly changed interface to the user with a channel indicator 201 displayed at the top of the editorial section 101. In addition, region 117 now only presents show selections which correspond to the user's selection.

Figure 3:
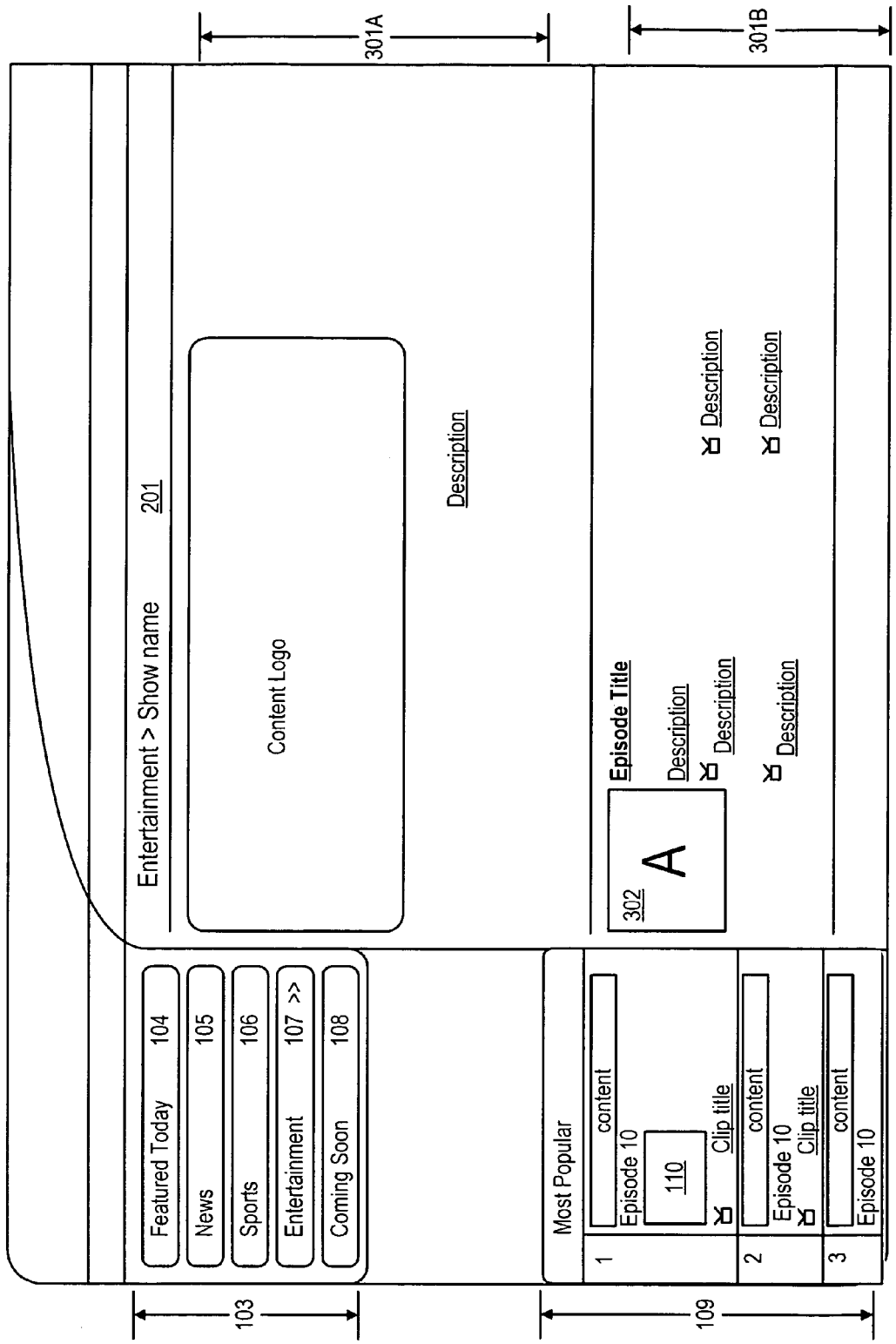
FIG. 3 illustrates a web site of one embodiment of the present invention after a show has been selected.

FIG. 3 illustrates the display of an embodiment of the invention when a user has selected a particular show. A user can select a show by clicking on that show title in area 117. When a show is selected, the Editorial area 101 is divided into two areas 301A and 301B. Area 301A displays a title, logo, or other indicator of the show selected and a text description of the show. Area 301B displays a thumbnail 302 of the episodes that are available for the show that is selected for viewing, along with text having a short written description of the selected episode. Additionally channel indicator 201 also indicates the name of the show that was selected. In one embodiment of the invention, a number of other clips available for viewing are displayed below area 301B and use a similar geography to display data, including a thumbnail image and text description. In this particular embodiment, the channel selections 104-108 remain visible and available in region 103, as does the Most Popular list in region 109.

Figure 4:
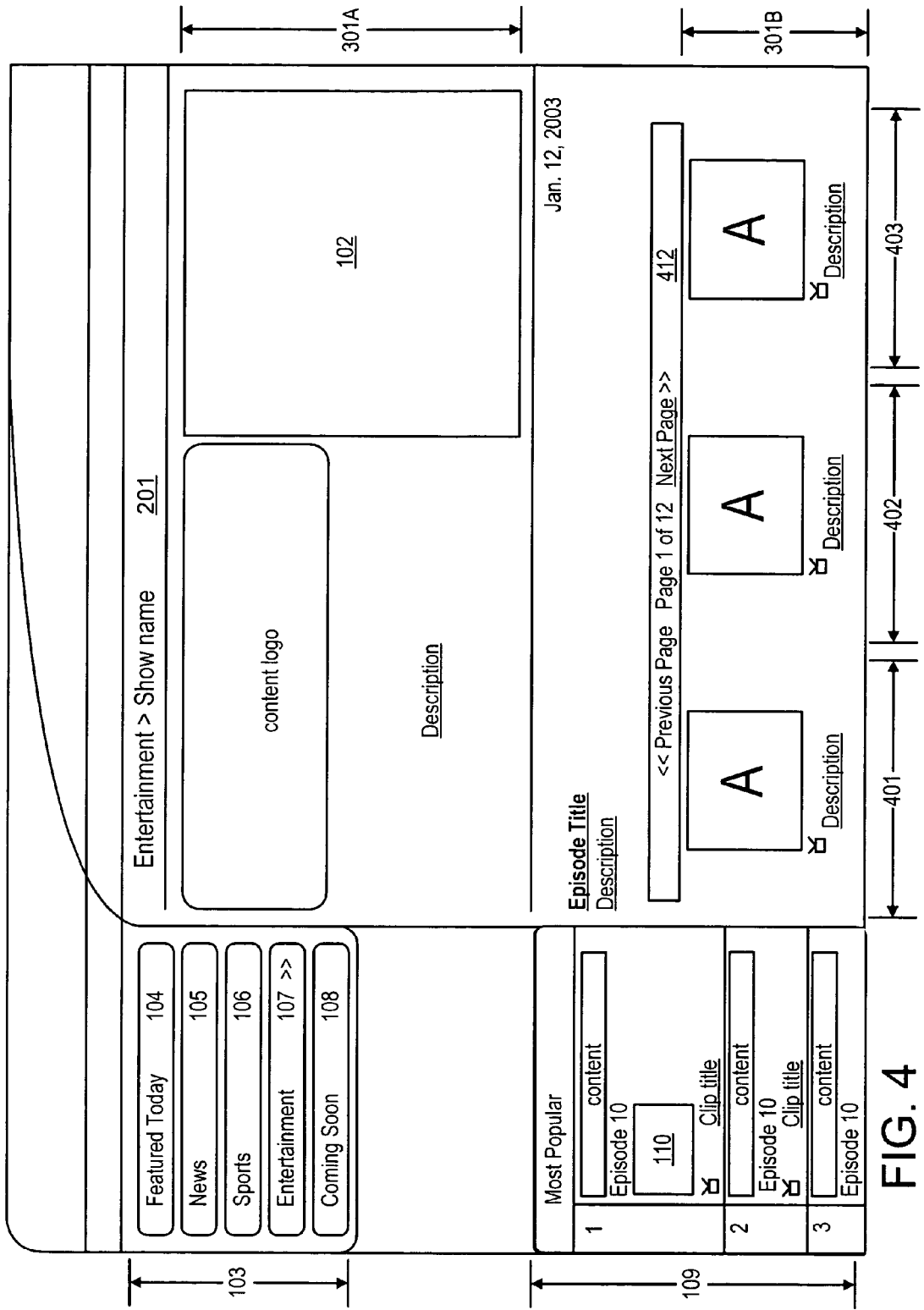
FIG. 4 illustrates a web site of one embodiment of the present invention after an episode has been selected.

FIG. 4 illustrates the display in an embodiment when the user selects an episode of a show by clicking on the episode in area 301B. When the episode is selected the editorial section 301B then displays a plurality of chapter or clip selections of the selected episode such as selections 401, 402, and 403. The user can select one of the for viewing in region 102 of this embodiment of the invention.

In this particular embodiment only three clip selections are displayed in area 301B listed at the bottom of the screen. If more clips are available, a bar 412 listing the amount of clips that are available can be displayed alerting the user that the additional clip selections are available. If the user clicks on bar 412, additional clips will be displayed in area 301B.

A desired feature of one embodiment of the present invention is that a user is only presented with data that the user can actually view at the subscription level of which the user is a member. This distinguishes the present embodiment of the invention from prior art schemes where the user may be presented with data that is not viewable based on the subscription level or even based on the player or connection speed of the user. One of the embodiments of the invention that makes this possible is that the data resides in a database on the web site of the invention. Unlike prior art schemes that link to external data sources, the present embodiment of the invention maintains data locally.

The present embodiment is able to customize content presentation because of the data structure of the database used for the local data storage. In one embodiment, data is stored using a unique XML template. This allows metadata to be included which facilitates the sorting and presentation of data to the user, making a consistent interface and experience possible.

In one embodiment, XML data is stored locally but some or all content is stored remotely and linked to a local site. It should be appreciated that the actual content or any images which are displayed on the website (e.g., thumbnail images) need not be stored locally in the website's local storage. Rather the content or any other image can come directly from an outside provider and be displayed in any of the interfaces of this invention. This provides the added benefit of being able to display a wide variety of content without having to overburden local storage capacity.

The template below is an example of one embodiment of an XML datastore template. The template is for a "FEEDITEM" which is associated with a clip for viewing. XML documents may have multiple FEEDITEMS. It should be noted that items are not required to have all elements listed and the values for each element are merely exemplary. Similarly, additional elements providing different information may be used.

```
<CMSFEED>
<CONTACT EMAIL=""
TELEPHONE=""></CONTACT>
<FEEDITEM TYPE=""MEDIA="" ID=""
SORTORDER="">
<TITLE><TITLE>
<DESCRIPTION></DESCRIPTION>
<DURATION></DURATION>
<VALIDTIME TZ=""></VALIDTIME>
<EXPIRATIONTIME TZ=""><EXPIRATIONTIME>
<BLACKOUT REGION=""></BLACKOUT>
<STREAM BITRATE="" FORMAT=""></STREAM>
<AIRTIME TZ=""></AIRTIME>
<IMAGE USE=""></IMAGE>
<FEEDITEM>
</CMSFEED>
```

XML Element Description

The XML elements described here are by way of example only. Additional or fewer elements may be included without departing from the spirit and scope of the present invention.

CMSFEED is the container for XML content feeds to the present embodiment of the invention and contains a number of other XML elements.

CONTACT xml Specs

The CONTACT element contains the name of the contact at the content publisher who is responsible for the content feed. (example: "Joe Smith")
- EMAIL: Email address of the person who is publishing this show. (example: "joesmith@yahoo-inc.com").
- TELEPHONE: Telephone number of the person who is publishing this show. (example: "800-555-1212").

FEEDITEM xml Specs

The FEEDITEM element holds the data for either a category or a clip.
- TYPE: This is the type of node being described. For the allowed values, "category" is a container for clips. Depending on the time of media being played in the invention, this could be equivalent to an episode of a TV show, or it could be used to represent another type of clips container.
- MEDIA: The type of media being described. This is only used for clips. "Video" refers to a video file. Audio" refers to an audio-only file.
- ID: Pathname of the show. (example: "/episode1" or "/episode3/clip1"). Maximum length for this field is 50 characters. Valid values for this field: In one embodiment the ID only consists of letters and numbers [i.e., A-Z|a-z|0-9] and no symbols [i.e., no #, @, etc.] are allowed in the ID.
- SORT ORDER: Valid values for this field include any number from 100 to 10000. In one embodiment of a list of clips or categories, the item with the highest number is displayed first, then the item with the second highest number is displayed next, and so on. The difference in SORTORDER between each item is in multiples of 10 in this embodiment. It is understood that the sorting can be in reverse order as well and any suitable difference between items may be employed.

TITLE xml Specs

The TITLE element is for the title of the piece of media. Referring briefly to FIG. 2, the title data is displayed in location 201 when it is category information and at location 320 in FIG. 3 when it is a show or clip title. In one embodiment, the maximum length of this field depends on the TYPE of FEEDITEM being described:
- For a "category" piece of media, the title length can be, e.g., up to 25 characters.
- For a "clip" piece of media, the title length can be, e.g., up to 50 characters.

DESCRIPTION xml Specs

The DESCRIPTION element is a description of the clip. It is displayed in the metadata pane and on the web site, such as at location 301A in FIG. 3. The length of this field depends on the TYPE of FEEDITEM being described:
- For a "category" piece of media, the length can be, e.g., up to 75 characters.
- For a "clip" piece of media, this field can be, e.g., up to 260 characters.

DURATION xml Specs

The DURATION element is the length of the clip in a format of hh:mm:ss.

VALIDTIME xml Specs

The VALIDTIME element is the date and time that the content will start being displayed on the invention site and will become available to subscribers. In some embodiments, this field is not required. The format for the element is mm/dd/yyyy hh:mm AM/PM.
- TZ: time zone of publish start and end times. Valid values: "CST"|"CDT"|"EST"|"EDT"|"MST"|"MDT"|"PST"|"PDT"

EXPIRATIONTIME xml Specs

The EXPIRATIONTIME element is the date and time that the content will be automatically removed from the invention site, and will no longer be available to subscribers. This field is not required in all embodiments. The format is mm/dd/yyyy hh:mm AM/PM.
- TZ: time zone of publish start and end times. Valid values: "CST"|"CDT"|"EST"|"EDT"|"MST"|"MDT"|"PST"|"PDT"

BLACKOUT xml Specs

The BLACKOUT element makes it possible to "black out" a piece of content from users whose account information indicates they are in a specific DMA (Designated Market Area). This could, for example, be used for sporting events which cannot be rebroadcast in specific areas. Valid values for this field depend on the REGION setting: For DMA, an example of a valid value is "SAN FRANCISCO-OAK-SAN JOSE," for ZIP (Zip code), an example of a valid value is "94089." This element is optional.

REGION: Sets system for selecting geographic areas to blackout.
Valid values: "DMA"|"ZIP".

STREAM xml Specs

The present embodiment of the invention can have multiple STREAM elements. However, for each FEEDITEM, the streams represented by these elements must have the same content. The only difference is the speed and media type. In one embodiment, a default value is such that each FEEDITEM clip has 6 streams (56 k windows media, 100 k windows media, 300 k windows media, 56 k real, 100 k real, 300 k real).

FORMAT: Stream format. Valid values ="wm"|"asf"|"wmv"|"wma"|"rnv"|"rm"|"rna"|"ra"
"wm" or "asf"=windows media file
"wmv"=windows media video file
"wma"=windows media audio-only file
"rnv" or "rm"=real networks video file
"rna" or "ra"=real networks audio-only file
BITRATE: Stream Speed. Valid values="56"|"100"|"300"

AIRTIME xml Specs

The AIRTIME element is the date and time that the clip was originally broadcast (if it was in fact broadcast). The format is mm/dd/yyyy hh:mm AM/PM
TZ: time zone of publish start and end times. Valid values: "CST"|"CDT"|"EST"|"EDT"|"MST"|"MDT"|"PST"| "PDT"

IMAGE xml Specs

The IMAGE element is an image for a FEEDITEM. The size for this image is, for example, 120×90, and is in a format such as GIF, JPEG, or any other suitable format in one embodiment. The IMAGE can be displayed in regions 206, 207, 302, 401, 402, or 403, for example.
USE: This describes how the content should be used. Each piece of media may, for example, have a "largethumb" and "smallthumb" associated with it—these images should be images from the piece of media. Valid values: "SMALLTHUMB"|"LARGETHUMB"
SMALLTHUMB: The size for this image may be, e.g., 88×66, and it may be in JPEG, GIF, or any other suitable format.
LARGETHUMB: The size for this image may be 120× 90, and it may be in JPEG, GIF, or any other suitable format.

Content Provider Accounts

A content provider that desires to interact with the site of the present embodiment of the invention has an assigned Content Management System (CMS) account with provider names and passwords. The providers can FTP (file transfer protocol) media files, images and XML feed documents using the template described above. The transferred media files, with the associated metadata according to the XML template, are then provided to a page generation tool and assembled into a window and accompanying channel modules. This process can be automated so that content can be published (assuming its availability date is current) almost instantly.

The database is accessible by content providers and partners via password, allowing remote editing and updating of the content. For example, a clip can easily be removed from the site by changing the expiration time entry to a date that has already passed. Data content may also inherit metadata attributes from its category and from its associated show. For example, an external site link may be inherited by a clip (such as to an official site for a show). In addition, copyright information may be inherited at a show or category level as well. Clips are associated with a show and shows are associated with a category.

Figure 5:
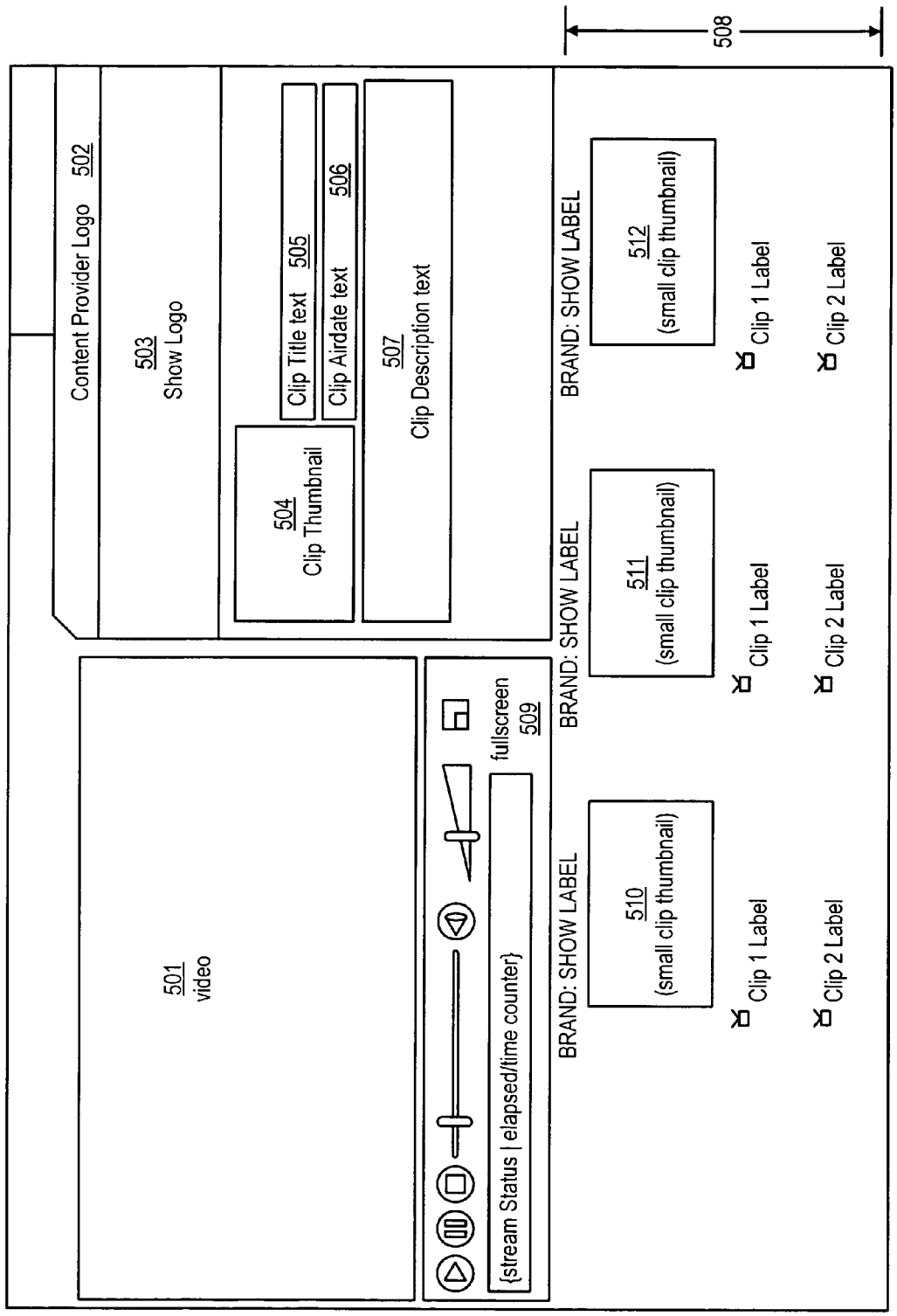
FIG. 5 illustrates a player of one embodiment of the present invention in an initial state.

FIG. 5 illustrates an alternate embodiment showing an interface on a media player. A media playing window 501 is provided at an upper-left location of the player geography. The viewing window 501 includes a control bar 509 just below the viewing window with player controls, such as play, pause, stop, progress bar, volume, etc. XML metadata associated with content can be mapped to areas of the player geography. Additionally, in one embodiment, various textual images may be placed in the viewing window while the video is buffering or while any audio content is playing. For example, while a news clip is buffering, information about the news provider may be displayed in the viewing window until the video is ready to be streamed.

Region 502 is an informational area reserved for a logo of the content provider. This could be a network, a show, a series, etc. Region 503 is another informational area reserved for a show logo graphic. Region 504 is reserved for a thumbnail of an available or selected clip. Regions 505 and 506 display the clip title metadata and airdate metadata, respectively. The metadata description text of the clip is displayed in region 507. Region 508 is reserved for additional available clips and displays thumbnails in regions 510, 511, and 512, for example, along with associated title and/or description metadata. Additional text and hyperlinks can also be displayed in area 508. For example advertising information allowing the user to link to additional material that is being offered.

Figure 6:
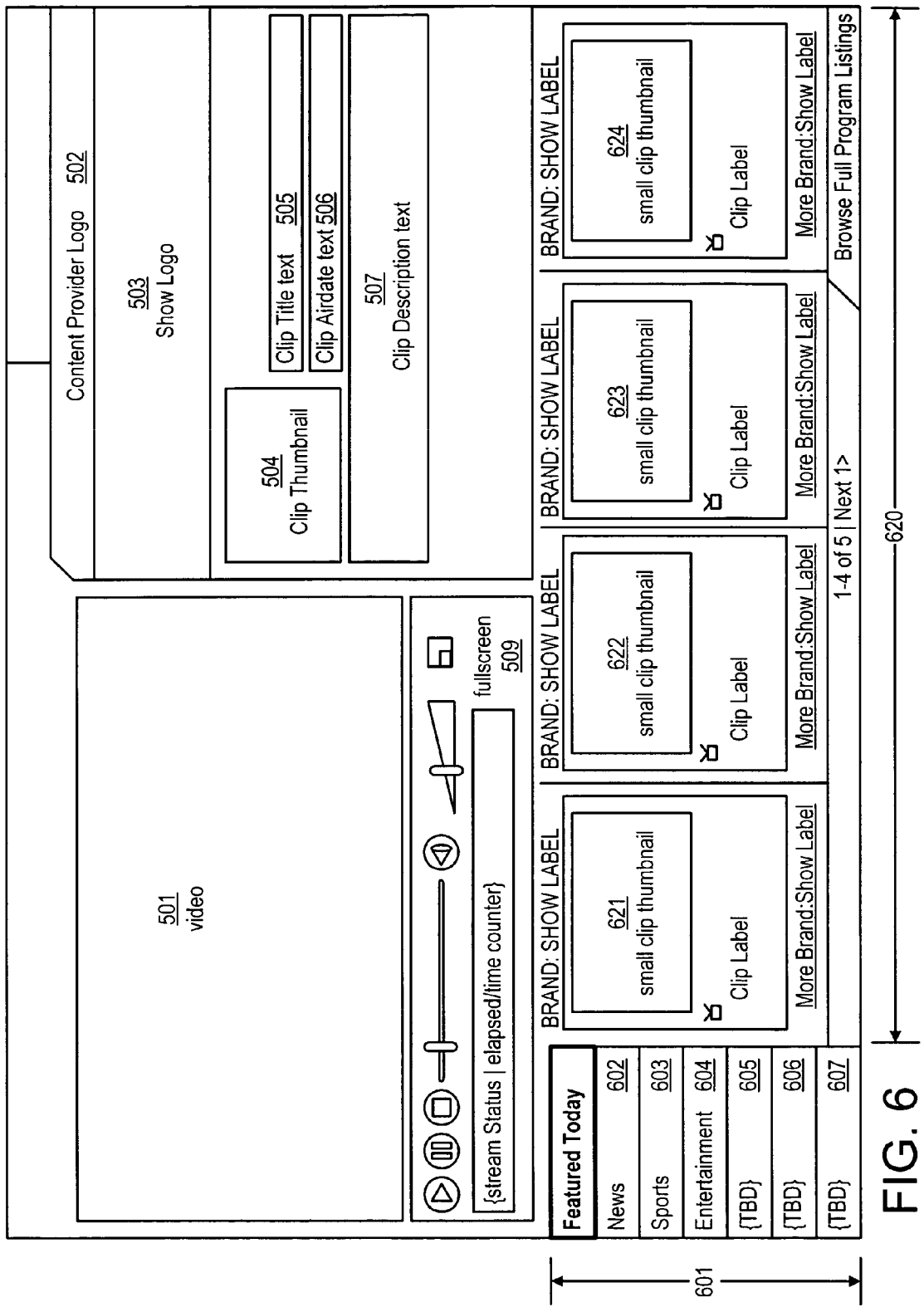
FIG. 6 illustrates a player of one embodiment of the present invention after a user menu selection.

FIG. 6 illustrates the interface of the player after a user has signed in. The bottom portion of the display geography is now changed to add channel selections 602-607 to region 601. In addition, Region 620 now displays a number of thumbnails of available clips such as thumbnails 621-624. This region can be scrolled horizontally in one embodiment to permit the display of additional thumbnails of available clips. In other embodiments, additional metadata and or hypertext links can be inserted throughout the interface to include additional features and functionality. For example, information and or hypertext links to external content provider sites might be added to the interface.

Figure 7:
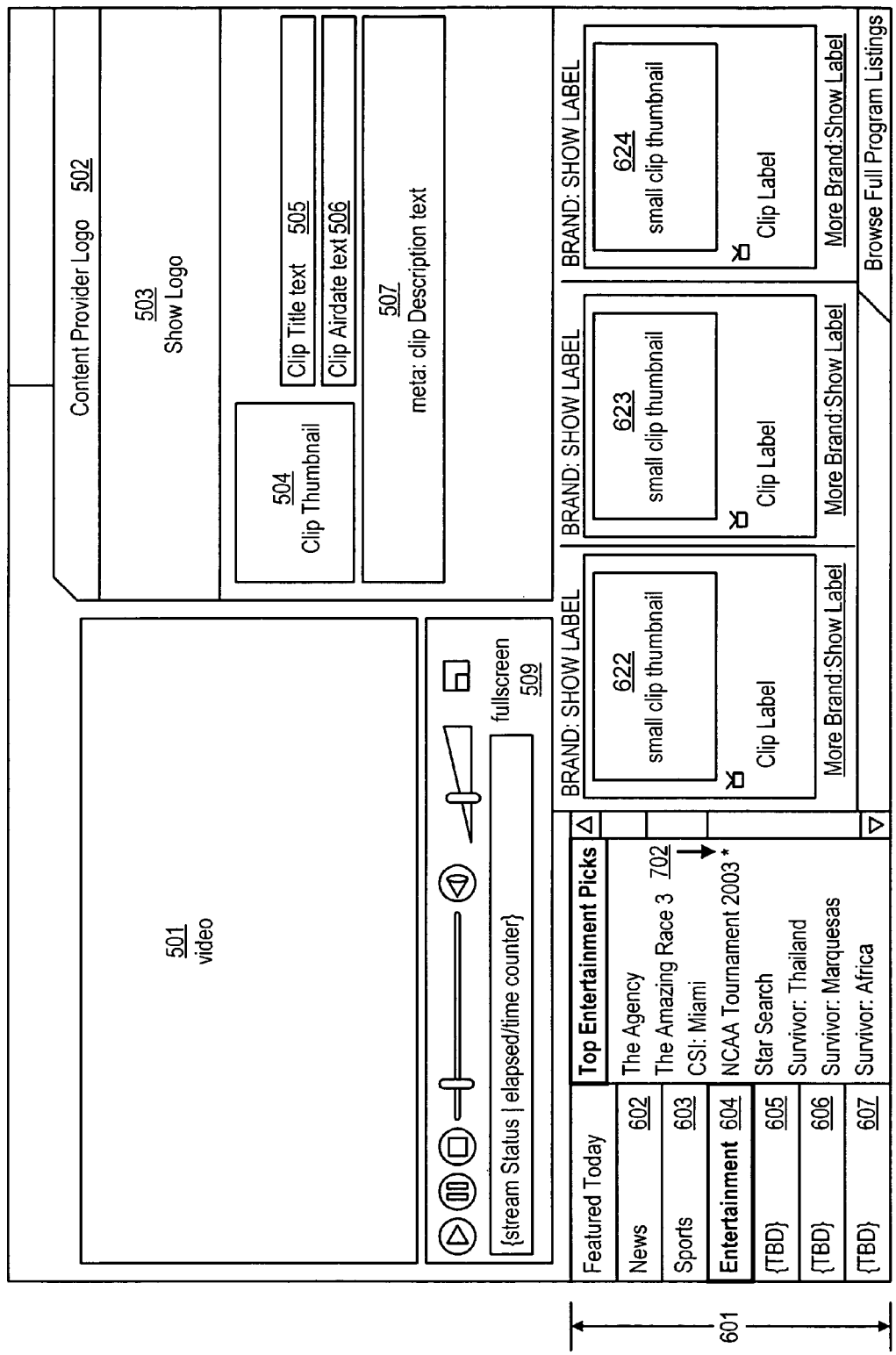
FIG. 7 illustrates a player of one embodiment of the present invention after a show has been selected.

FIG. 7 illustrates the interface of the player when one of the channels in region 601 is selected. In this example, Entertainment Channel 604 has been selected. This causes a pull-down menu 701 to be displayed in the region adjacent to region 601 and displays available content for the selected channel. The example illustrates one of the advantages of the present embodiment of the invention. One of the selections, namely the NCAA Tournament 2003, includes a following star symbol 702. This indicates premium content and the user knows that this content is not available unless the user has a premium account. This is possible because of the local storage of content by the present embodiment of the invention and the use of the XML metadata to store access levels which are required for certain content. In another embodiment, only available permitted content at the user level is shown, with premium or other unavailable content filtered out. This makes the viewing experience more desirable using the present embodiment of the invention. In one embodiment, the indication is not marked. When a user attempts to play content for which the user does not have access, the user may be redirected to a presentation that offers the ability to subscribe to the service.

It should be understood that in certain embodiments the player may be a third-party player which is "skinned" or altered to provide the desired consistent interface. In other embodiments, the player is a purpose built player.

Figure 8:
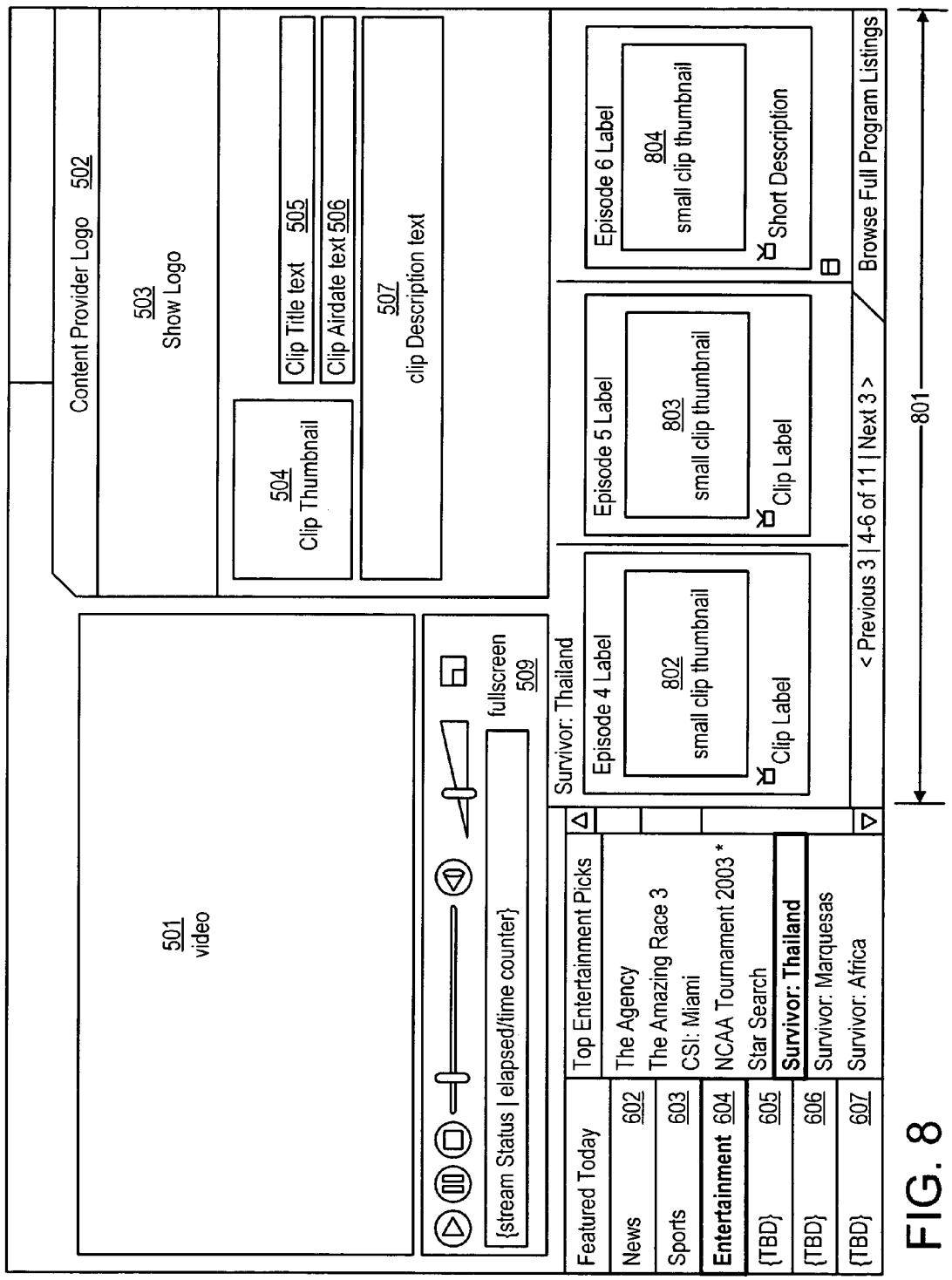
FIG. 8 illustrates a player of one embodiment of the present invention after an episode has been selected.

FIG. 8 illustrates the interface when a show has been selected in region 701. The title of the show is displayed in region 801 and thumbnails of available episodes are shown in regions 802-803. In one embodiment, region 801 is scrollable so that all available episodes can be accessed via that region. An additional region 804 which lists a description for a future episode may also be displayed. In one embodiment a user is given the option to add the future episode description to a personal calendar so that the user will be reminded at the time that the episode becomes available.

The present embodiment includes additional information in a local database in addition to the metadata provided by a content provider. This information can also be XML metadata or it can be associated attributes of the database in any suitable form. This data includes subscription information such as active/inactive, and level of subscription (e.g., regular, premium, package, etc.).

Figure 9:
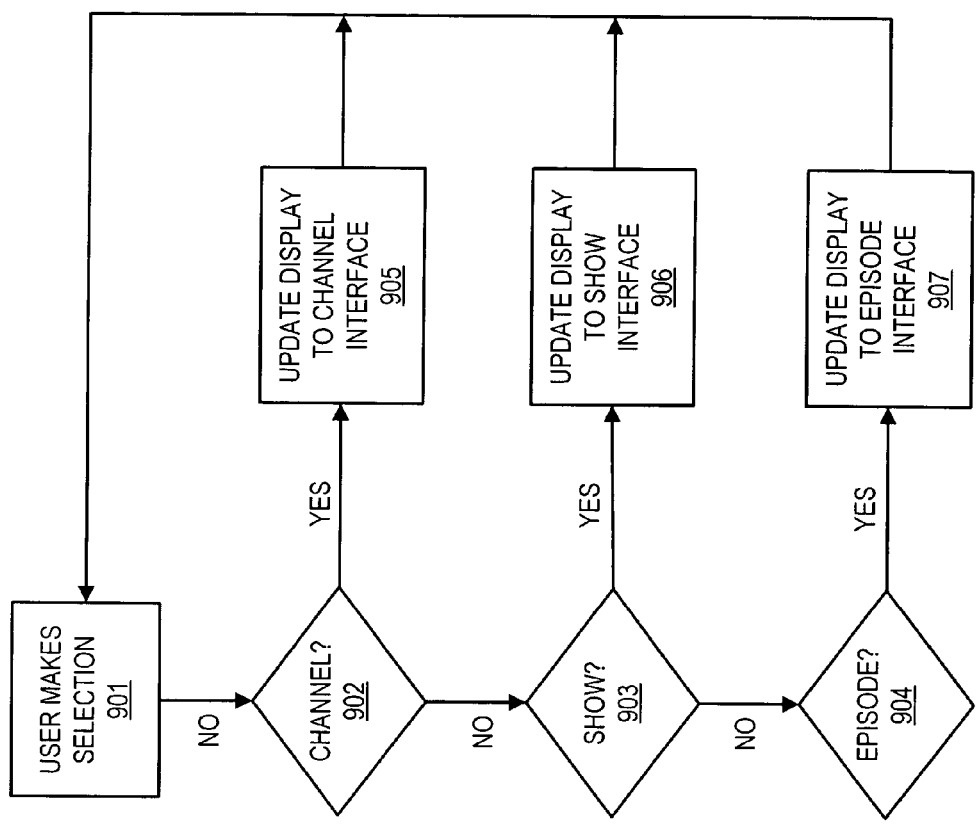
FIG. 9 is a flow diagram illustrating an embodiment of the operation of the present invention.

FIG. 9 is a flow diagram illustrating the operation of the present embodiment. At step 901, a user makes a selection and the system then goes through a number of decision blocks 902-904 to determine the appropriate display update to provide. At step 902, it is determined if the user has selected a channel. If so, the display is updated at step 905 and provides a display such as shown in FIGS. 2 and 7.

At step 903, it is determined if the user has selected a show. If so, the display is updated at step 906 and provides a display on the site such as shown in FIG. 3 or on the player such as shown in FIG. 8. At step 904, it is determined if the user has selected an episode. If so, the site display is updated such as shown in FIG. 4 and the player is updated such as is shown in FIG. 8.

Figure 10:
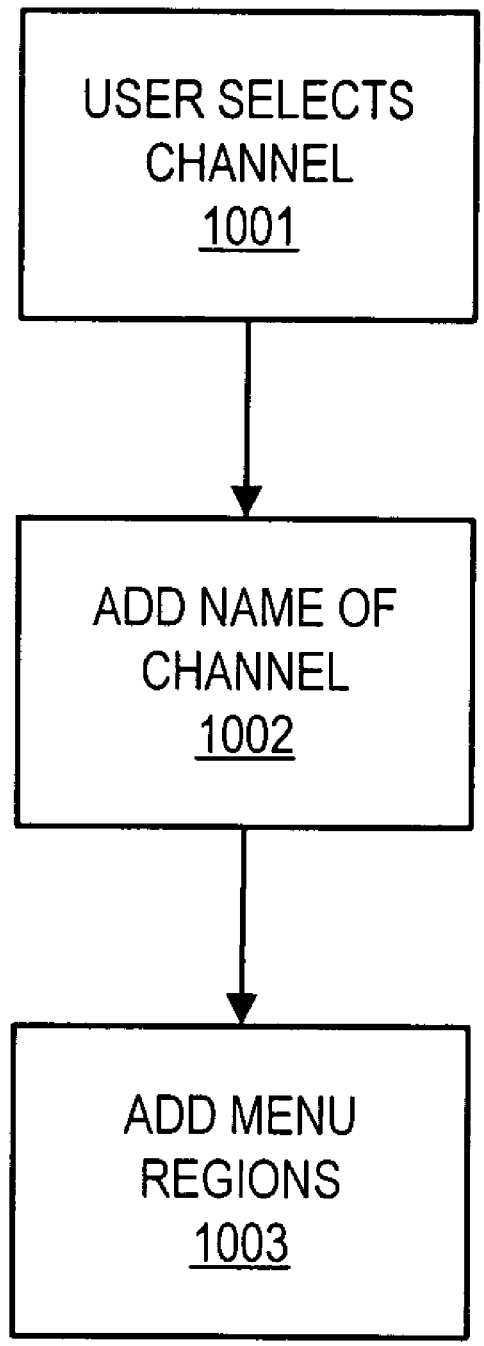
FIG. 10 is a flow diagram illustrating an embodiment of the invention.

FIG. 10 illustrates some of the operation of an embodiment of the invention when a channel is selected. At step 1001, the user has selected a channel. At step 1002, the system updates the display by placing the name of the selected channel in region 201 for the site. For the player, the display provides a pull down menu 701. At step 1003, a "Most Popular" display region 208 is provided at the site. For the player, the database is examined so that premium shows in the list can be identified by a marker, such as "star" 702.

In another embodiment of the invention, it is possible to create playlists related to user preferences. These lists can be either automatically generated based on content provider relationships, or editorially. These playlists will be discussed in more detail with reference to FIGS. 16 and 17 below.

Content Invocation

Figure 12:
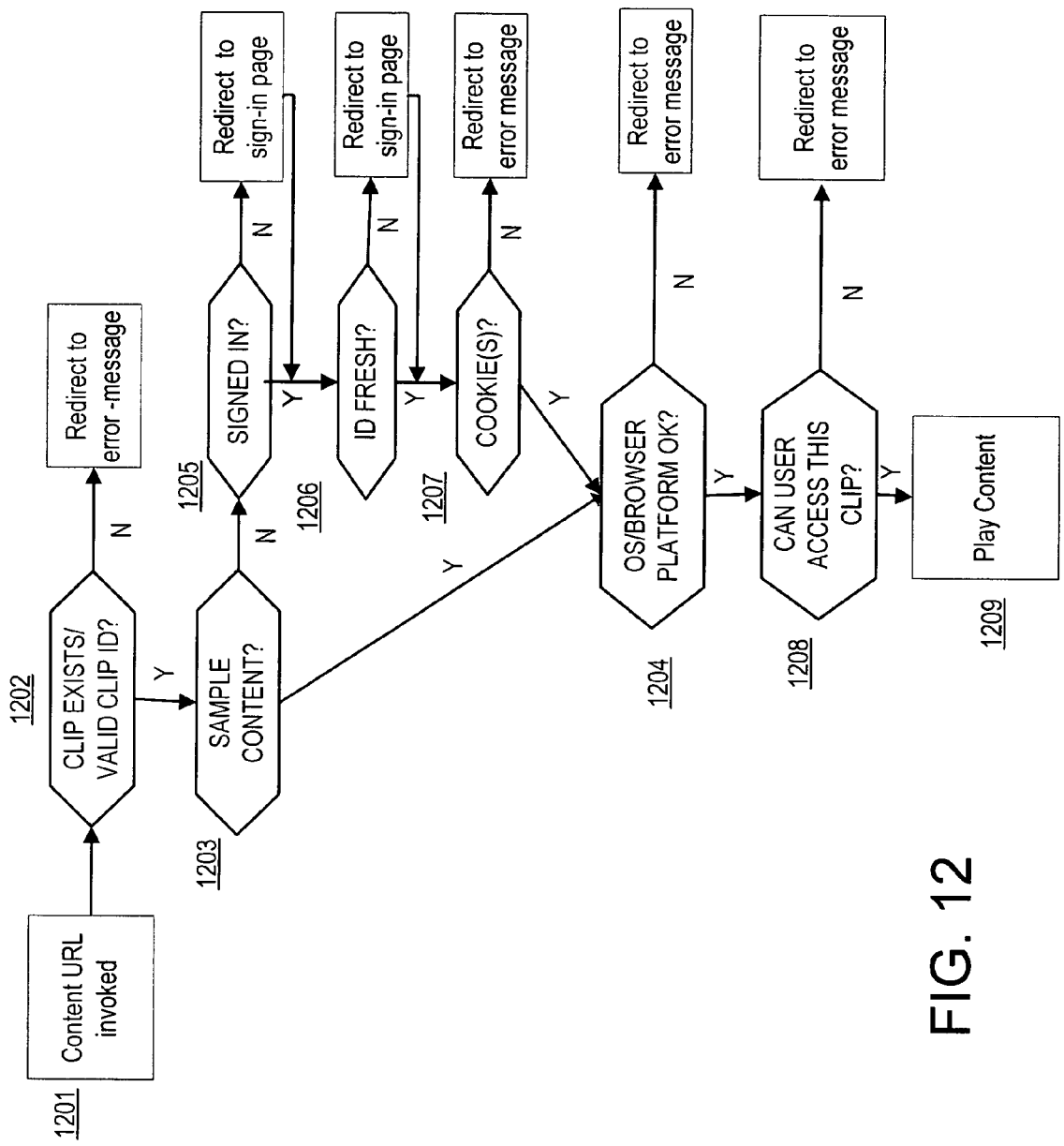
FIG. 12 is a flow diagram illustrating the content invocation flow of one embodiment of the present invention.

FIG. 12 illustrates the operation of content invocation in one embodiment of the invention, or in other words the steps that are followed once a user selects a particular piece of content. At step 1201 of FIG. 12, the user invokes a content uniform resource locator (URL) by clicking on a clip link from the browser, activating a bookmarked URL, being redirected from another website, accessing the link from within the a player popup or by a variety of other means as are all well known in the art. Once the content URL is invoked, it is determined whether there is an existing clip that corresponds to the requested clip I.D. number corresponding to the link (step 1202). If it is determined that the clip I.D. does not have a corresponding existing clip, the browser redirects the user to an error message, which may advise the user that there is no existing clip that matches their requested clip I.D. number. Other error messages can include additional text that informs the user that there is some error in receiving the content. These messages can additionally include details about the clip and possible reasons why the clip can not be displayed, and can direct the user to possible solutions to correct this error. Otherwise, if it is determined that the requested clip I.D. has a clip available, it is next determined whether the user has requested to view sample marketing content (step 1203). Sample marketing content includes content that can be viewed by any user regardless of whether the user has subscribed to view non-sample content or whether the user has purchased the rights to view additional clips. It should be appreciated that an advantage to making sample content available to any user is to allow users the ability to test the system before actually subscribing or purchasing any particular service.

If it is determined that the user has chosen to view sample marketing content, the process will proceed to step 1204 where it is determined whether the operating software (OS) and browser platforms on the user's computer are acceptable for playing the requested content. For example, an acceptable OS platform could be Windows and an acceptable browser platform could be Internet Explorer 5.0 or higher. If it is determined that the platforms are not acceptable, the browser page redirects the user to an error message, which may inform the user that the platforms running on his computer are not compatible with the web site's platform(s). Otherwise, if it is determined that the platforms are acceptable, the system will determine if the user has a proper subscription to access the clip at Step 1205 as will be discussed in greater detail below.

If it is determined however at Step 1203 that the user does not choose to view sample marketing content, and rather wishes to view content that is only available to users who are signed into the website, it is then determined whether the user has signed into the web site (step 1205). If it is determined that the user has not signed in, the browser page redirects the user to a sign in page to allow the user to sign into the website. Once the user signs in or if it is determined that the user has previously signed in, it is then determined whether the web page identification (I.D.) is still fresh (step 1206). It should be appreciated that checking whether an I.D. is still fresh allows the system to determine whether the user has recently signed into the website or whether the sign in took place past an allotted period of time. This prevents an unauthorized user from using an old sign in to access the system at a later time. The amount of time that an sign in remains fresh can be determined by the system operator or by the user and can range for example from a few minutes to many days. If it is determined that the I.D. is not fresh, the browser page redirects the user to a sign in page, which can advise the user that the session has expired and request the user to sign in again.

Once the user has signed in again, or if it is determined that the I.D. is still fresh, it will next be determined whether the user's computer is configured to be accept cookies (step 1207). If it is determined that the user's computer is unable to accept cookies, the browser redirects the user to an error message, which may request that the user configure his computer to accept cookies. If it is determined that the user's computer is able to accept cookies, the system proceeds to Step 1204 as was discussed above to determine whether the operating software and browser platforms on the user's computer are acceptable. If it is determined that the platforms are not acceptable, the browser page redirects the user to an error message, which can inform the user that the platforms running on their computer are not compatible with the web site's platform(s). Otherwise, if it is determined that the platforms are acceptable, the system will then determine whether the user has the subscription to be able to access the requested clip (step 1208). It should be appreciated that the system can have many different levels of subscriptions to control different levels of access for different users. These different levels can be determined by various factors (e.g., price of subscription). If the user does not have the proper subscription to access the clip, the browser redirects the user to an error message, which can advise the user that their subscription level does not permit access to this clip. Additionally the error message may provide information to the user about how to upgrade their current subscription to allow access to the clip or provide details regarding other benefits of obtaining a higher subscription.

If it is determined at the previously discussed logic gate located at step 1208, that the user does have access to the clip, the player will be invoked and begin to play the content (step 1209). It should be appreciated that the player that is invoked can be any of the media players that are widely known in the art (e.g., Windows Media Player, Real Player) or can be a purpose built player as was discussed above.

In one embodiment, an additional step is carried out prior to the playing of content to assure that the content request is valid and to protect the system from unauthorized access.

Figure 13:
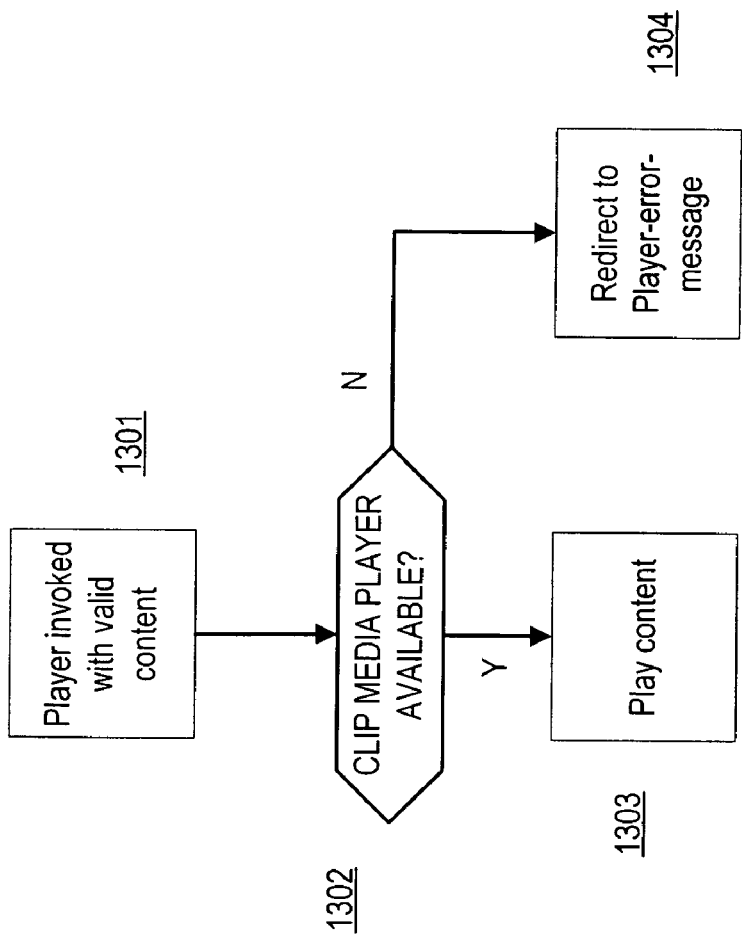
FIG. 13 is a flow diagram illustrating the confirmation of media playback capability.

After successful content invocation, the embodiment may undergo a logic sequence to confirm media playback capability. One possible logic process is depicted in FIG. 13. Once content has been invoked (step 1301), at a logic gate (step 1302), it is determined whether the user's computer has the necessary clip media player available. This decision is made by determining whether the user's computer has the correct software to play the content, (e.g., Real or WinMP). If it is determined that the necessary software has not been installed onto the user's computer, the browser redirects to a software error message, which may advise the user that he will need to install specific software onto his computer in order to view the content. Otherwise, if it is determined that the necessary software has been installed onto the user's computer, the process proceeds to step 1303 where the audio/video content will be played as discussed above with reference to FIG. 8.

WebPage Site Map

Figure 14:
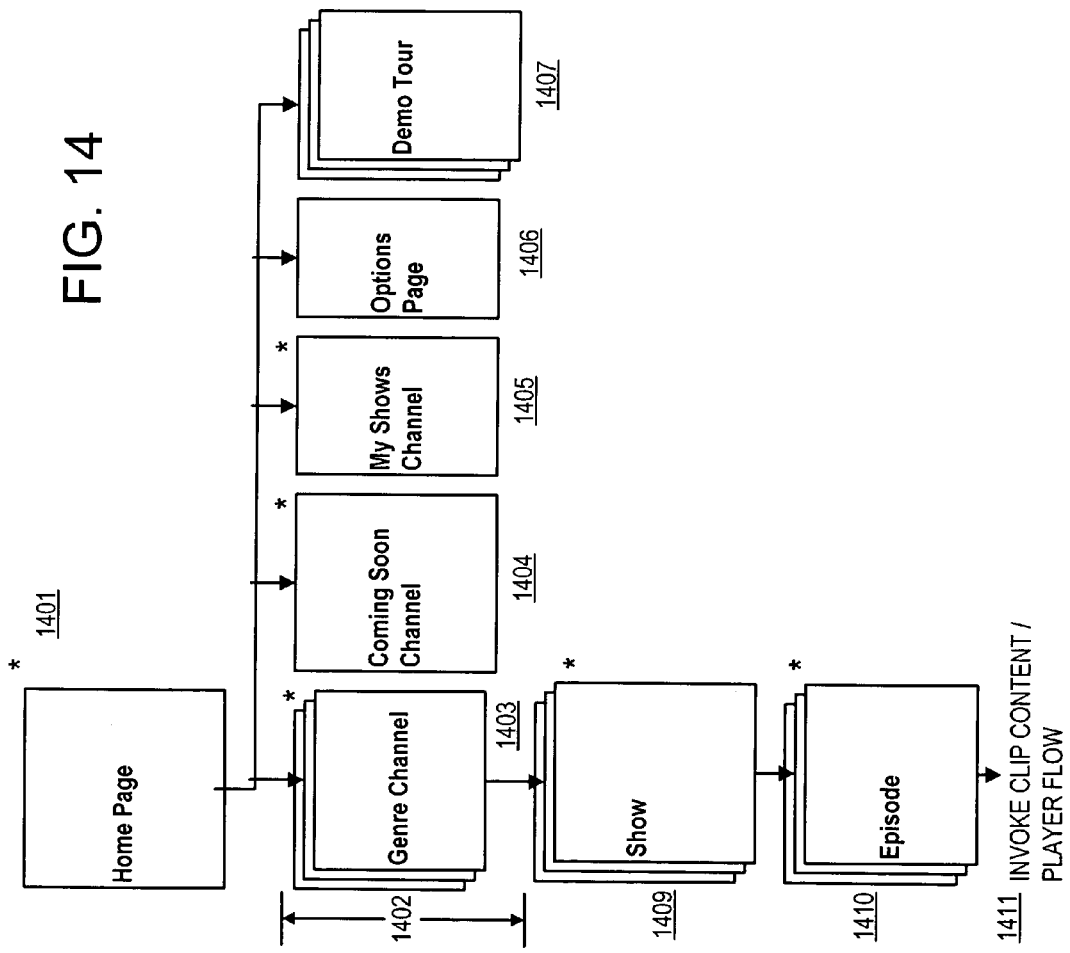
FIG. 14 is a flow diagram illustrating site-map hierarchy of one embodiment of the present invention.

One embodiment of the present invention can be represented by a web page hierarchy site map. FIG. 14 depicts one possible site map hierarchy for a content invocation structure.

FIG. 14 illustrates the path of web pages that a user navigates through in order to invoke audio/video clip content. Page 1401 represents the web site home page, which allows the user to make a number of various choices. On the home page, the user is given various options from which to choose. The pages on level 1402 illustrate the different options that the user can choose from. Some of the choices presented in this embodiment are "genre channel" (page 1403), which includes a list of shows available for that particular genre; "coming soon channel" (page 1404), which includes a list of shows that are currently not available on the system but will be in the future; "my shows channel" (page 1405), which includes a list of shows that has previously been chosen by the user; "Options page" (page 1406), where the user can manage any account details such as subscription level or personal information or change any particular viewing preferences the user may have; and a "demo tour" (page 1407) which gives the user a demonstration of how the website operates. Additionally the user may receive one of an array of error messages if the content can not be displayed for various reasons. Examples of such error messages include, a sign in error if the user does not sign in properly; an unavailable content error if the content is not in the system or if the system is unable to locate the content; or a subscription error message if the user does is not subscribed to the proper service in order to view access the requested content. In addition to the displaying of the error message, the system also redirects the user to another page which will allow the user to correct the error (e.g., a sign in page, a subscription page).

If the user selects a type of genre in page 1403, the web site will transfer the user to a lower level on the site map (page 1409). At page 1409, the user is presented with a listing of available shows to choose from which includes a list of episodes or collections for that particular show. Once the user selects a show to watch, the web site will transfer the user to a lower level on the site map (page 1410), which lists the available episodes for that particular show which includes a listing of clips that are available for a particular episode. After a user selects an episode from the listing on page 1410, the process will proceed to step 1411 where the player will be invoked to operate. It should also be appreciated that content can be directly invoked from different web pages as opposed to having to access numerous web pages before actually invoking content. In this particular embodiment those web pages which can directly invoke content are designated with an asterisk. It should also be appreciated that in various embodiments there can be other webpages that list prevalent information. For example one web page might list help topics that the user can access or legal information such as privacy information. These informative web pages can preferably be accessed from any of the above listed web pages.

Embodiment of a Computer Execution Environment

Figure 11:
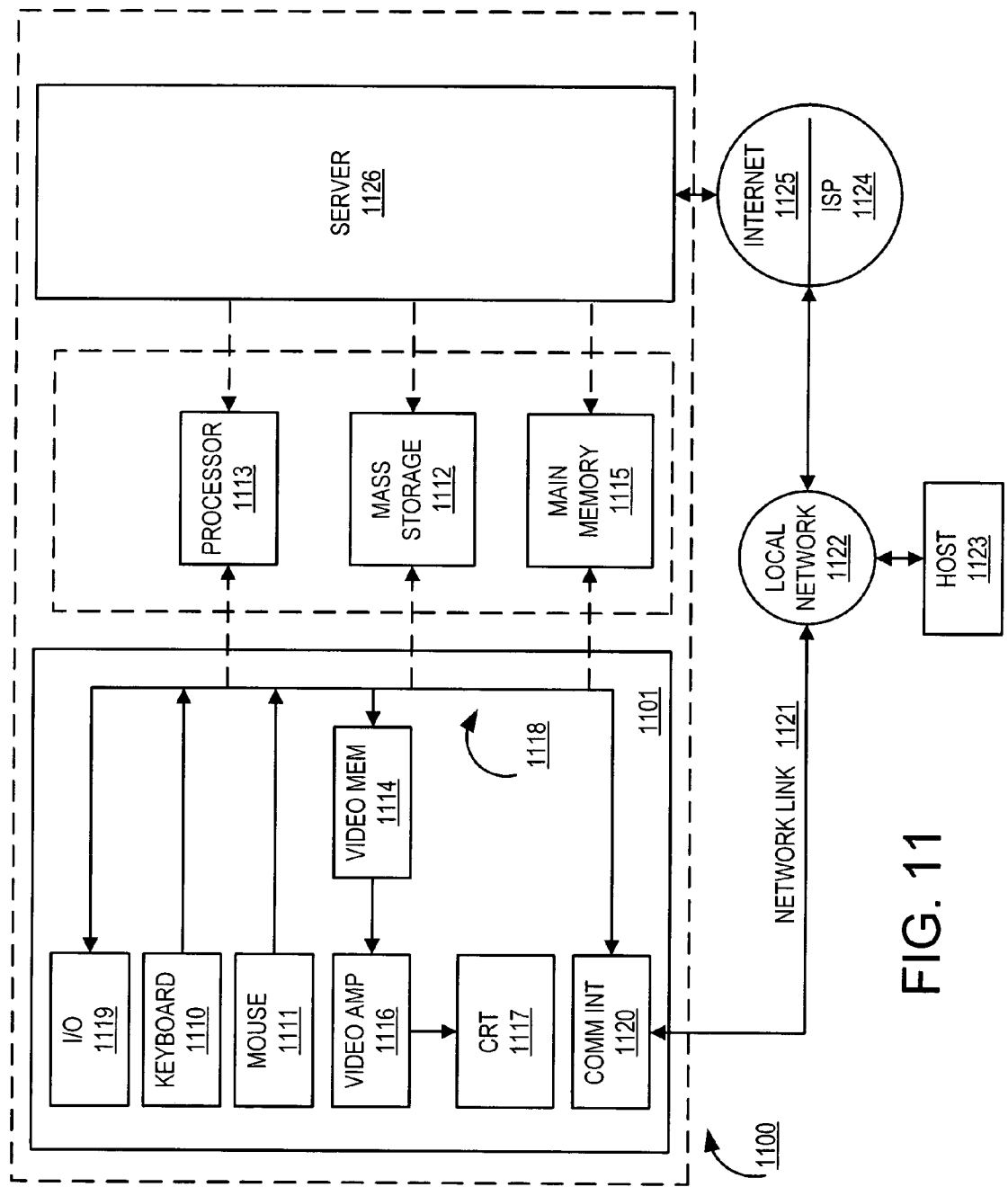
FIG. 11 is a flow diagram illustrating one embodiment of the present invention being implemented as computer software in the form of computer readable code.

An embodiment of the invention can be implemented as computer software in the form of computer readable code executed in a desktop general purpose computing environment such as environment 1100 illustrated in FIG. 11, or in the form of bytecode class files running in such an environment. A keyboard 1110 and mouse 1111 are coupled to a bi-directional system bus 1118. The keyboard and mouse are for introducing user input to a computer 1101 and communicating that user input to processor 1113.

Computer 1101 may also include a communication interface 1120 coupled to bus 1118. Communication interface 1120 provides a two-way data communication coupling via a network link 1121 to a local network 1122. For example, if communication interface 1120 is a modem, communication interface 1120 provides a data communication connection to the corresponding type of telephone line, which comprises part of network link 1121. If communication interface 1120 is a local area network (LAN) card, communication interface 1120 provides a data communication connection via network link 1121 to a compatible LAN. Wireless links are also possible. In any such implementation, communication interface 1120 sends and receives electrical, electromagnetic or optical signals, which carry digital data streams representing various types of information.

Network link 1121 typically provides data communication through one or more networks to other data devices. For example, network link 1121 may provide a connection through local network 1122 to local server computer 1123 or to data equipment operated by ISP 1124. ISP 1124, in turn, provides data communication services through the worldwide packet data communication network now commonly referred to as the "Internet" 1125. Local network 1122 and Internet 1125 both use electrical, electromagnetic or optical signals, which carry digital data streams. The signals through the various networks and the signals on network link 1121 and through communication interface 1120, which carry the digital data to and from computer 1100, are exemplary forms of carrier waves transporting the information.

Processor 1113 may reside wholly on client computer 1101 or wholly on server 1026 or processor 1113 may have its computational power distributed between computer 1001 and server 1126. In the case where processor 1113 resides wholly on server 1126, the results of the computations performed by processor 1113 are transmitted to computer 1101 via Internet 1125, Internet Service Provider (ISP) 1124, local network 1122 and communication interface 1120. In this way, computer 1101 is able to display the results of the computation to a user in the form of output. Other suitable input devices may be used in addition to, or in place of, the mouse 1111 and keyboard 1110. I/O (input/output) unit 1119 coupled to bi-directional system bus 1118 represents such I/O elements as a printer, A/V (audio/video) I/O, etc.

Computer 1101 includes a video memory 1114, main memory 1115 and mass storage 1112, all coupled to bi-directional system bus 1118 along with keyboard 1110, mouse 1111 and processor 1113.

As with processor 1113, in various computing environments, main memory 1115 and mass storage 1112, can reside wholly on server 1126 or computer 1101, or they may be distributed between the two. Examples of systems where processor 1113, main memory 1115, and mass storage 1112 are distributed between computer 1101 and server 1126 include the thin-client computing architecture developed by Sun Microsystems, Inc., the palm pilot computing device, Internet ready cellular phones, and other Internet computing devices.

The mass storage 1112 may include both fixed and removable media, such as magnetic, optical or magnetic optical storage systems or any other available mass storage technology. Bus 1118 may contain, for example, 32 address lines for addressing video memory 1114 or main memory 1115. The system bus 1118 also includes, for example, a 32-bit data bus for transferring data between and among the components, such as processor 1113, main memory 1115, video memory 1114, and mass storage 1112. Alternatively, multiplex data/address lines may be used instead of separate data and address lines.

In one embodiment of the invention, the processor 1113 is a microprocessor manufactured by Motorola, such as the 680×0 processor or a microprocessor manufactured by Intel, such as the 80×86 or Pentium processor, or a SPARC microprocessor from Sun Microsystems, Inc. However, any other suitable microprocessor or microcomputer may be utilized. Main memory 1115 is comprised of dynamic random access memory (DRAM). Video memory 1114 is a dual-ported video random access memory. One port of the video memory 1114 is coupled to video amplifier 1116. The video amplifier 1116 is used to drive the cathode ray tube (CRT) raster monitor 1117. Video amplifier 1116 is well known in the art and may be implemented by any suitable apparatus. This circuitry converts pixel data stored in video memory 1114 to a raster signal suitable for use by monitor 1117. Monitor 1117 is a type of monitor suitable for displaying graphic images.

Computer 1101 can send messages and receive data, including program code, through the network(s), network link 1121 and communication interface 1120. In the Internet example, remote server computer 1126 might transmit a requested code for an application program through Internet 1125, ISP 1124, local network 1122 and communication interface 1120. The received code may be executed by processor 1113 as it is received, and/or stored in mass storage 1112, or other non-volatile storage for later execution. In this manner, computer 1100 may obtain application code in the form of a carrier wave. Alternatively, remote server computer 1126 may execute applications using processor 1113, and utilize mass storage 1112, and/or video memory 1115. The results of the execution at server 1126 are then transmitted through Internet 1125, ISP 1124, local network 1122, and communication interface 1120. In this example, computer 1101 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus an environment for display of content has been described.

Playlists

As was discussed earlier, in one embodiment of the invention, one can create playlists based on various criteria. These playlists can be automatically generated or created manually. For example, a playlist may be automatically generated based on the most popular clips that have been viewed recently or clips that were uploaded onto the system on a certain date or clips as grouped based on any other information or metadata associated therewith. In another instance the playlist may be created based on a certain relationship (e.g., war with Iraq) and put together manually. Additionally, the user themselves can choose which pieces of content are placed into a playlist. Similar to an individual piece of content, content in a playlist and/or the playlist itself can be accessed by a user from the various web page interfaces discussed above. Alternatively, content from a certain category may be automatically grouped into a playlist and when the category is chosen, the playlist will begin to play. It should be appreciated that although the use of playlists is discussed in reference to the present embodiment, such embodiment is exemplary and the playlist features disclosed herein may be implemented on other systems.

The playlist is preferably a data file that comprises a plurality of unique identifiers (e.g., URLs) for a plurality of pieces or items of content. The data file is created by choosing which content should be included in the playlist and then placing an URL for each piece of content into the file. Thus, when the data file is played, the content will be viewed in the sequence that it has been placed in the playlist. It should be understood that another advantage of utilizing a playlist for organizing content is that the use of a playlist creates an additional pointer to each piece of content thus allowing the user to access each piece of content from different locations and thus making the content more easily accessible.

Figure 15:
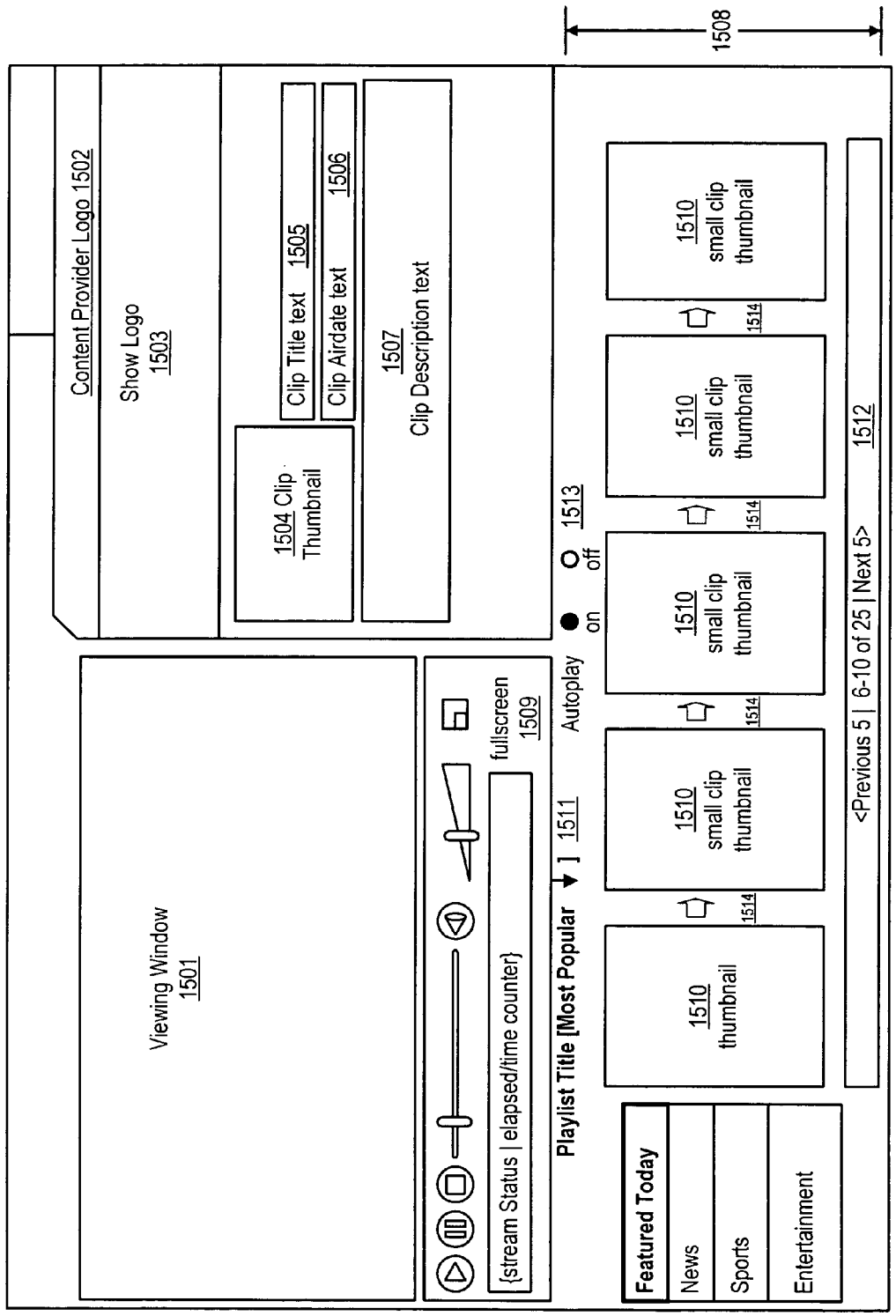
FIG. 15 is a player of one embodiment of the present invention.

One interface used in connection with playlists will now be discussed in reference to FIG. 15. Similar to previous embodiments, the display includes a media playing window 1501 at an upper-left location of the player geography. The viewing window 1501 includes a control bar 1509 just below the viewing window with player controls, such as play, pause, stop, progress bar, volume, etc. XML metadata associated with content can be mapped to areas of the player geography. Region 1502 is an informational area reserved for a logo of the content provider. This could be a network, a show, a series, or any other metadata that the content provider wishes to supply. Region 1503 is another informational area reserved for a show logo graphic. Region 1504 is reserved for a thumbnail of an available or selected clip. Regions 1505 and 1506 display the clip title metadata and airdate metadata, respectively. The metadata description text of the clip is displayed in region 1507. Region 1508 displays the clips that are available in the playlist which includes a thumbnail image of the available clip which is also a hypertext link to access the clips 1510. Region 1508 also contains a drop down list of all the playlists that are available for viewing 1511. This drop down list can include a plurality of playlists which can either be dynamically generated playlists or playlists created manually. If a user clicks onto the drop down list a list similar to list 701 discussed in reference to FIG. 7 is displayed.

In this particular embodiment only up to five clips in the playlist are listed at the bottom of the screen. If more clips are available, a bar 1512 listing the amount of clips that are available can be displayed alerting the user that the playlist contains additional clips. If the user clicks on bar 1512, additional clips will be displayed in area 1508.

In one embodiment a user can choose whether or not the clips should play in the particular order that they were stored in the playlist. If the user chooses to play the clips sequentially, an "autoplay" function is engaged (e.g., "on"). If the user wishes to alter the order in which the clips are played, the "autoplay" function can be disengaged. For example, if Playlist 1 contains pointers to clips A, B and C, a user can choose to engage the "autoplay" function and play the clips sequentially (i.e., clip A first then clip B and then clip C.) Alternatively, the user can disengage the "autoplay" function and play the clips in a selected order, for example, play clip B first and then the other clips in whichever order the user wishes.

Figure 16:
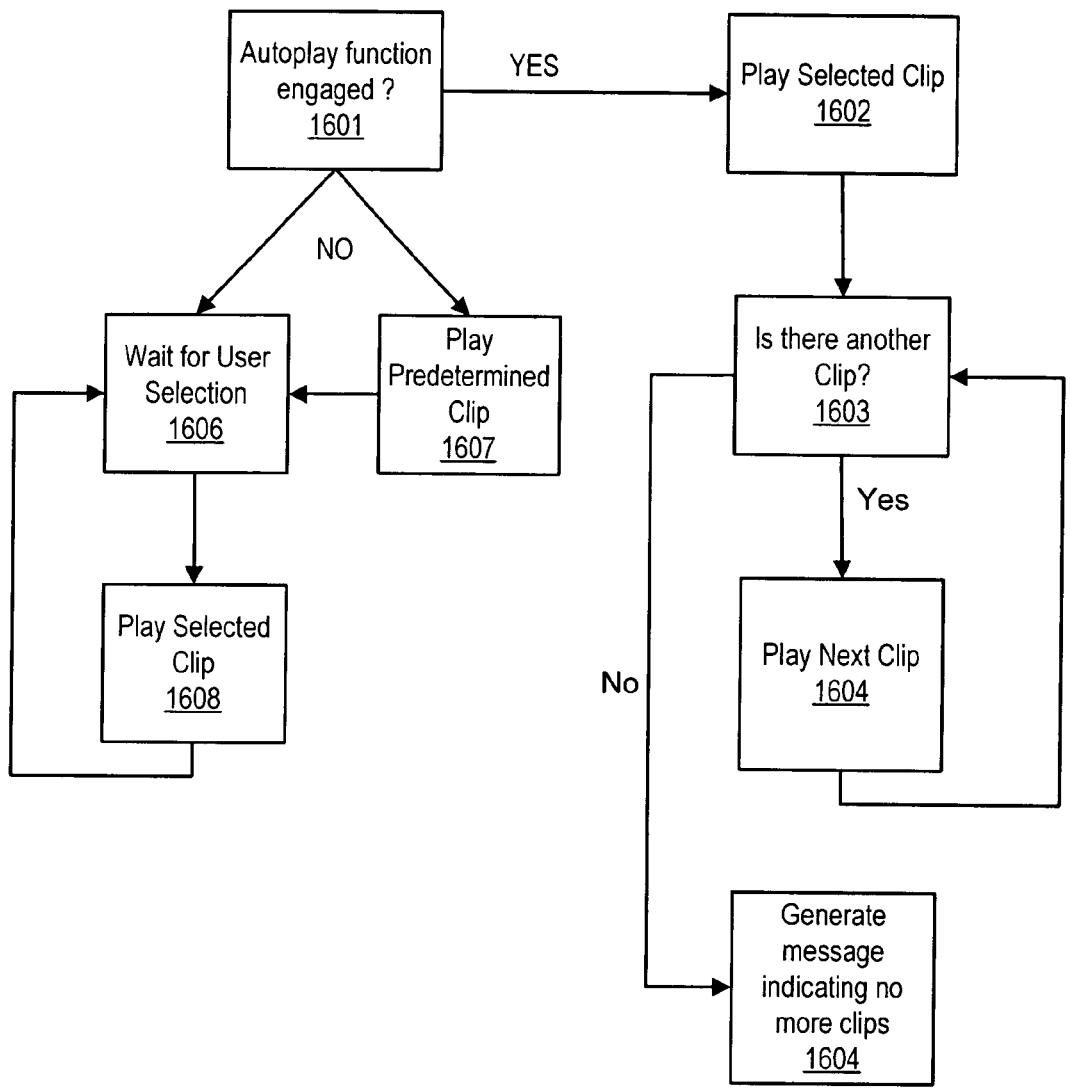
FIG. 16 is a flow diagram illustrating one embodiment of the present invention.

The process of engaging the "autoplay" function will now be discussed in greater detail with reference to FIG. 16. At first, when a user selects the playlist that he wishes to display or listen to, the system checks whether the "autoplay" function is engaged. Step 1601. If the "autoplay" function is engaged, the system begins to play the selected clip from the playlist. Step 1602. When that clip is finished playing, the system automatically searches for the next clip in the sequence. Step 1603. If there is another clip in the sequence of the playlist then the system begins to play that clip. Step 1604. If all the clips have been played and there are no remaining clips in the playlist, the system sends a message that the playlist is completed. Step 1605. This process continues until all clips in the playlist have been played.

If the "autoplay" function is not engaged (e.g., "off"), the system waits for the user to select a clip. Step 1606. Alternatively the system may begin playing a predetermined clip. Step 1607. Once a clip is selected, the system begins to play that clip. Step 1608. Once the selected clip is finished playing, the system having identified that the "autoplay" function was disengaged does not sequentially play the content in the playlist, and instead waits for the user to select another clip to be played. Step 1606. A user can select a clip by clicking on the hypertext link associated with that clip. Once another clip is selected, the system plays that selected clip. Step 1608. This process continues until the user does not want to view any more clips. It should be appreciated that an added benefit of this embodiment is to give the user added control over what content they wish to view and in which order they wish to view it. The user is thus given the ability to manage the content that he or she is viewing in a more editorial role, while at the same time being able to have the benefits of a playlist which include easier accessibility and improved functionality.

In one embodiment, when the "autoplay" function is engaged (e.g., "on") a display button 1513 which is also an active hypertext link is displayed on the web page which indicates whether the function is engaged. In the present embodiment of FIG. 16 the "autoplay" function is already engaged. If a user wishes to engage or disengage the "autoplay" function, the user can merely click on that display button and the function will be activated or deactivated respectively. Additional indications that the "autoplay" function is engaged can be utilized as well. For example in FIG. 15, arrows 1514 indicate that the "autoplay" function is active. While the absence of arrows would indicate to the user that the "autoplay" function was disengaged and the clips can be played in non-sequential order.

Those skilled in the art will recognize that the method and system of the present invention has many applications, may be implemented in many manners and, as such, is not to be limited by the foregoing exemplary embodiments and examples. In this regard, any number of the features of the different embodiments described herein may be combined into one single embodiment and alternate embodiments having fewer than all of the features are possible. Moreover, the scope of the present invention covers conventionally known and future developed variations and modifications to the system components described herein, as would be understood by those skilled in the art.

We claim:

1. A computer-implemented method comprising:

generate an interface at a site on a network for display on a user computer, a plurality of media files provided by a plurality of media file providers being made available to said user computer via said network site using said interface;

define a set of metadata attributes relating to said media files, each of said metadata attributes of the set having a respective predetermined location in said interface regardless of media file or media file provider;

receive said plurality of media files provided by said plurality of media file providers via the network, the received media files for use with said interface;

associate metadata attributes from within said defined set of metadata attributes with said plurality of media files, wherein said plurality of media files is provided by the plurality of media file providers;

compiling a data file that contains one or more unique identifiers which identify one or more media files, the data file being compiled automatically based on criteria chosen by one of a plurality of users;

utilize the metadata attributes to map the plurality of media files to an interface, said interface generated at a site on a network, said media files being made available to a user computer via said network site using said interface; and map each of said associated metadata attributes to its respective predetermined location in said interface, such that in said interface each of said associated media attributes appears in its respective predetermined same location for all of said media files and media file providers, wherein said metadata attributes comprises a title for the media file and one or more of a description, duration and an expiration of the media file;

determining whether a user-selectable autoplay function is engaged for a given one of said plurality of users;

in a case that the autoplay function is determined to be engaged, determining a sequence in which said user is to experience media content corresponding to one or more media files based on an ordering of said unique identifiers in the data file; and in a case that the autoplay function is determined to be disengaged, determining the sequence in which said user is to experience media content corresponding to said one or more media files based on input from the user and without regard to the ordering of said unique identifiers in the data file, wherein said media content is experienced using an interface that comprises:
- a channel description portion to display a plurality of channel selections corresponding to the plurality of media files provided by the plurality of media file providers for selection by said user;
- a show description portion to display one or more show selections, and in response to user selection one of the channel selections said show description portion displays only those show selections corresponding to the chosen channel selection;
- an episode description portion to display one or more episode selections, and in response to user selection one of the one or more show selections said episode description portion displays only those episode selections corresponding to the chosen show selection; and
- a viewer to view media file content at the user's computer, the media file content corresponding to the channel, show and episode selections made by the user using the interface.

2. The method of claim 1 wherein the data file is automatically compiled based on some criteria.

3. The method of claim 1 wherein the data file is compiled manually.

4. The method of claim 1 wherein the one or more media files are provided by more than one source.

5. The method of claim 1, further comprising:
determining media content other than said media content corresponding to said one or more media files for said user to experience while waiting for said user input.

6. A system comprising:
one or more servers configured to:
- generate an interface at a site on a network for display on a user computer, a plurality of media files provided by a plurality of media file providers being made available to said user computer via said network site using said interface;
- define a set of metadata attributes relating to said media files, each of said metadata attributes of the set having a respective predetermined location in said interface regardless of media file or media file provider;
- receive said plurality of media files provided by said plurality of media file providers via the network, the received media files for use with said interface;
- associate metadata attributes from within said defined set of metadata attributes with said plurality of media files, wherein said plurality of media files is provided by the plurality of media file providers;
- compile a data file that contains one or more unique identifiers which identify one or more pieces of content, the data file being automatically compiled based on criteria chosen by one of a plurality of users;
- utilize the metadata attributes to map the plurality of media files to an interface, said interface generated at a site on a network, said media files being made available to a user computer via said network site using said interface; and
- map each of said associated metadata attributes to its respective predetermined location in said interface, such that in said interface each of said associated media attributes appears in its respective predetermined same location for all of said media files and media file providers, wherein said metadata attributes comprises a title for the media file and one or more of a description, duration and an expiration of the media file;
- determine whether a user-selectable autoplay function is engaged for a given one of said plurality of users;
- in a case that the autoplay function is determined to be engaged, determine a sequence in which said user is to experience media content corresponding to said one or more pieces of content based on an ordering of said unique identifiers in the data file; and
- in a case that the autoplay function is determined to be disengaged, determine the sequence in which said user is to experience media content corresponding to said one or more pieces of content based on input from the user and without regard to the ordering of said unique identifiers in the data file, wherein said media content is experienced using an interface that comprises:
- a channel description portion to display a plurality of channel selections corresponding to the plurality of media files provided by the plurality of media file providers for selection by said user;
- a show description portion to display one or more show selections, and in response to user selection of one of the channel selections said show description portion displays only those show selections corresponding to the chosen channel selection;
- an episode description portion to display one or more episode selections, and in response to user selection of one of the show selections said episode description portion displays only those episode selections corresponding to the chosen show selection; and
- a viewer to view media file content at the user's computer, the media file content corresponding to the channel, show and episode selections made by the user using the interface.

7. The system of claim 6 wherein the data file is compiled manually.

8. The system of claim 6 wherein the one or more media files are provided by more than one source.

9. The system of claim 6, wherein said one or more servers are further configured to:
determine media content other than said media content corresponding to said one or more media files for said user to experience while waiting for said user input.

10. A computer program product embodying computer code and comprising a computer-readable storage medium tangibly storing computer code thereon, said computer code to configure one or more processors to:
- generate an interface at a site on a network for display on a user computer, a plurality of media files provided by a plurality of media file providers being made available to said user computer via said network site using said interface;
- define a set of metadata attributes relating to said media files, each of said metadata attributes of the set having a respective predetermined location in said interface regardless of media file or media file provider;
- receive said plurality of media files provided by said plurality of media file providers via the network, the received media files for use with said interface;
- associate metadata attributes from within said defined set of metadata attributes with said plurality of media files, wherein said plurality of media files is provided by the plurality of media file providers;
- compile a data file that contains one or more unique identifiers which identify one or more pieces of content, the data file being automatically compiled based on criteria chosen by one of a plurality of users;

utilize the metadata attributes to map the plurality of media files to an interface, said interface generated at a site on a network, said media files being made available to a user computer via said network site using said interface; and map each of said associated metadata attributes to its respective predetermined location in said interface, such that in said interface each of said associated media attributes appears in its respective predetermined same location for all of said media files and media file providers, wherein said metadata attributes comprises a title for the media file and one or more of a description, duration and an expiration of the media file;

determine whether a user-selectable autoplay function is engaged for a given one of said plurality of users;

in a case that the autoplay function is determined to be engaged, determine a sequence in which said user is to experience media content corresponding to said one or more pieces of content based on an ordering of said unique identifiers in the data file; and in a case that the autoplay function is determined to be disengaged, determine the sequence in which said user is to experience media content corresponding to said one or more pieces of content based on input from the user and without regard to the ordering of said unique identifiers in the data file, wherein said media content is experienced using an interface that comprises:

a channel description portion to display a plurality of channel selections corresponding to the plurality of media files provided by the plurality of media file providers for selection by said user;

a show description portion to display one or more show selections, and in response to user selection of one of the channel selections said show description portion displays only those show selections corresponding to the chosen channel selection;

an episode description portion to display one or more episode selections, and in response to user selection of one of the show selections said episode description portion displays episode selections corresponding to the chosen show selection; and a viewer to view media file content at the user computer, the media file content corresponding to the channel, show and episode selections made by the user using the interface.

11. The computer program product of claim 10, wherein the computer code further comprises computer code to configure one or more processors to:

determine media content other than said media content corresponding to said one or more media files for said user to experience while waiting for said user input.

12. A system comprising:

one or more servers configured to:

compile a plurality of media files for use with an interface, said plurality of media files compiled from a plurality of media file providers;

generate an interface at a site on a network for display on a user computer, said interface comprising a region to display media content of the plurality of media files provided by the plurality of media file providers and being made available to said user computer via said network site, a region to display selectable indicia corresponding to one or more playlists, a region to display indicia of each of said plurality of media files identified by a selected one of said playlists, and a region to display selectable indicia of an autoplay function configured to control an order in which each of said plurality of media files identified by a selected one of said playlists is to be experienced using said interface, wherein said autoplay function is configured to control whether said order in which each of said plurality of media files identified by a selected one of said playlists is determined based on contents of said selected one of said playlists or based on user input, and wherein said user input comprises selection of one or more of said indicia of said plurality of media files identified by a selected one of said playlists;

authenticate said user's authorization to access certain media content;

define a set of metadata attributes relating to said media files, each of said metadata attributes of the set having a respective predetermined location in said interface regardless of the media file or media file provider;

receive said plurality of media files provided by said plurality of media file providers via said network, the received media files for use with said interface;

associate metadata attributes from the set of metadata attributes with each of said received media files;

utilize the metadata attributes to map the plurality of media files to an interface, said interface generated at a site on a network, said media files being made available to a user computer via said network site using said interface; and map each of said associated metadata attributes to its respective predetermined location in said interface, so that in said interface for said user each of said associated metadata attributes appears at its respective predetermined location in said interface for all of said media files and media file providers, wherein said metadata attributes comprises a title for the media file and one or more of a description, duration and an expiration of the media file, filtering said plurality of media files based on said user's authorization to access certain media content such that said user interface includes selectable indicia for only those media files corresponding to said certain media content, wherein said interface comprises:

a channel description portion to display a plurality of one or more channel selections corresponding to the plurality of media files provided by the plurality of media file providers for selection by said user;

a show description portion to display one or more show selections, and in response to user selection of one of the channel selections said show description portion displays only those show selections corresponding to the chosen channel selection;

an episode description portion to display one or more episode selections, and in response to user selection of one of the show selections said episode description portion displays only those episode selections corresponding to the chosen show selection; and a viewer to view media file content at the user computer, the media file content corresponding to the channel, show and episode selections made by the user using the interface.

13. A computer-implemented method comprising:

compiling a plurality of media files for use with an interface, said plurality of media files compiled from a plurality of media file providers;

generating an interface at a site on a network for display on a user computer, said interface comprising a region to display media content of a plurality of media files provided by a plurality of media file providers and being made available to said user computer via said network site, a region to display selectable indicia corresponding to one or more playlists, a region to display indicia of each of said plurality of media files identified by a selected one of said playlists, and a region to display selectable indicia of an autoplay function configured to control an order in which each of said plurality of media files identified by a selected one of said playlists is to be experienced using said interface, wherein said autoplay function is configured to control whether said order in which each of said plurality of media files identified by a selected one of said playlists is determined based on contents of said selected one of said playlists or based on user input, and wherein said user input comprises selection of one or more of said indicia of said plurality of media files identified by a selected one of said playlists; and authenticating said user's authorization to access certain media content;

defining a set of metadata attributes relating to said media files, each of said metadata attributes of the set having a respective predetermined location in said interface regardless of the media file or media file provider;

receiving said plurality of media files provided by said plurality of media file providers via said network, the received media files for use with said interface;

associating metadata attributes from the set of metadata attributes with each of said plurality of media files, wherein the metadata attributes comprises a title for each media file;

utilize the metadata attributes to map the plurality of media files to an interface, said interface generated at a site on a network, said media files being made available to a user computer via said network site using said interface; and mapping each of said associated metadata attributes to its respective predetermined location in said interface, so that in said interface each of said associated metadata attributes appears at its respective predetermined location in said interface for all of said media files and said media file providers wherein said metadata attributes comprises a title for the media file and one or more of a description, duration and an expiration of the media file; and filtering said plurality of media files based on said user's authorization to access certain media content such that said user interface includes selectable indicia for only those media files corresponding to said certain media content, wherein said interface comprises:

a channel description portion to display a plurality of channel selections corresponding to the plurality of media files provided by the plurality of media file providers for selection by said user;

a show description portion to display one or more show selections, and in response to user selection of one of the channel selections said show description portion displays only those show selections corresponding to the chosen channel selection;

an episode description portion to display one or more episode selections, and in response to user selection of one of the show selections said episode description portion displays only those episode selections corresponding to the chosen show selection; and a viewer to view media file content at the user computer, the media file content corresponding to the channel, show and episode selections made by the user using the interface.

* * * * *